(12) United States Patent
Mizukura et al.

(10) Patent No.: US 9,828,055 B2
(45) Date of Patent: Nov. 28, 2017

(54) REAR FUEL TANK

(71) Applicant: HONDA MOTOR CO., LTD., Tokyo (JP)

(72) Inventors: Yuki Mizukura, Wako (JP); Takashi Sasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/866,003

(22) Filed: Sep. 25, 2015

(65) Prior Publication Data

US 2016/0090141 A1 Mar. 31, 2016

(30) Foreign Application Priority Data

Sep. 30, 2014 (JP) ................................. 2014-201383

(51) Int. Cl.
*B62J 35/00* (2006.01)
*B62K 11/04* (2006.01)

(52) U.S. Cl.
CPC ............... *B62J 35/00* (2013.01); *B62K 11/04* (2013.01)

(58) Field of Classification Search
CPC .................................. B62J 35/00; B62K 11/04
USPC ........................................................ 280/834
See application file for complete search history.

(56) References Cited

U.S. PATENT DOCUMENTS

| 7,841,625 | B2 | 11/2010 | Gruber et al. | |
|---|---|---|---|---|
| 2008/0000707 | A1* | 1/2008 | Gruber | B62J 35/00 180/219 |
| 2012/0074139 | A1* | 3/2012 | Hisadomi | B60K 15/04 220/200 |
| 2015/0014079 | A1* | 1/2015 | Takasaki | B62K 11/04 180/229 |
| 2016/0107713 | A1* | 4/2016 | Takano | B62K 5/027 180/210 |

FOREIGN PATENT DOCUMENTS

| JP | S62-283084 A | 12/1987 |
|---|---|---|
| JP | 09207849 A * | 8/1997 |

* cited by examiner

*Primary Examiner* — Joseph M Rocca
*Assistant Examiner* — Felicia L. Brittman
(74) *Attorney, Agent, or Firm* — Squire Patton Boggs (US) LLP

(57) ABSTRACT

A vehicle includes a rear fuel tank provided with a pump opening for mounting therein a fuel pump. The pump opening is formed in a position on an inner side of a front tank part in a vehicle width direction in comparison with lateral walls of lateral tank parts on the inner side in the vehicle width direction.

16 Claims, 16 Drawing Sheets

REAR FUEL TANK

BACKGROUND

Field

The present invention relates to a rear fuel tank supported by a rear part of a vehicle body frame of a saddle-ride type vehicle.

Description of the Related Art

There is a saddle-ride type vehicle such as a motorcycle including a rear fuel tank provided to a rear part of a vehicle body frame. The rear fuel tank of this type is disclosed (for example, see JP-A No. S62-283084 (Patent Literature 1)), the rear fuel tank being configured such that as a shape using a space between the vehicle body frame and a rear wheel below the vehicle body frame, the rear fuel tank is formed into a U shape when viewed from above.

When a rear fuel tank is formed into a U shape or an L shape when viewed from above, movement of a rear wheel cannot be prevented by the rear fuel tank when the rear wheel swings vertically. Therefore, a stroke of the rear wheel can be ensured.

However, when a method for feeding fuel is intended to be changed from the existing type using a carburetor to a fuel injection system, there is such a problem that in the U-shaped or L-shaped rear fuel tank, a sufficient plane for mounting a fuel pump is less likely to be ensured.

SUMMARY

Embodiments of the present invention have been accomplished in view of the above-mentioned circumstances and an object of the present invention is to provide a rear fuel tank being provided for a saddle-ride type vehicle, the rear fuel tank being configured such that a plane for mounting a fuel pump is easily ensured and the fuel pump can be arranged without increasing a width of a tank.

In order to address the above-mentioned problem, according to certain embodiments of the present invention, there is provided a rear fuel tank, the rear fuel tank being provided for a saddle-ride type vehicle including an engine, and a vehicle body frame that supports the engine. A swing arm extends rearward from the vehicle body frame and has a rear end with a rear wheel vertically swingably arranged thereat. The rear fuel tank is supported by a rear part of the vehicle body frame. The rear fuel tank includes a lateral tank part that is arranged on a lateral side of the rear wheel, and a front tank part that is arranged in front of the rear wheel and that is connected to a front side of the lateral tank part. In the rear fuel tank, a fuel pump is provided for feeding fuel in the rear fuel tank to the engine, and an opening is provided for mounting therein the fuel pump. The opening is formed in a position on an inner side of the front tank part in a vehicle width direction in comparison with a lateral wall of the lateral tank part on the inner side in the vehicle width direction.

In certain embodiments, the fuel pump may be mounted to a fuel pump mounting part formed on an upper surface of the front tank part, and an upwardly swelling part that swells upward from the upper surface of the front tank part may be formed behind the fuel pump mounting part.

In certain embodiments, the inside of the upwardly swelling part may be made to serve as a fuel space. Also, the upwardly swelling part may be formed to have a width larger than a width of the rear wheel.

In some embodiments, a battery may be provided above the upper surface of the front tank part and in front of the upwardly swelling part. Also, the upwardly swelling part may swell upward beyond the battery.

In certain embodiments, a battery tray may be provided for supporting the battery, and a front part of the battery tray may be supported by an air cleaner arranged in front of the battery.

In some embodiments, the fuel pump may be offset to either a right side or a left side from a centerline of the rear wheel in the vehicle width direction. The battery may be arranged on the other side in order to prevent overlapping with the fuel pump mounting part when viewed from above.

In certain embodiments, a recessed part that is recessed upward while avoiding a chain for transmitting driving force to the rear wheel may be formed in the bottom part on either a right side or a left side of the rear fuel tank. Also, the fuel pump may be arranged in a position located on the other side of the right side and the left side of the rear fuel tank and prevent overlapping with the recessed part when viewed from above.

With certain embodiments of the present invention, the fuel pump is provided for feeding fuel in the rear fuel tank to the engine, and the opening is provided for mounting therein the fuel pump. The opening is provided in the position on the inner side of the front tank part in the vehicle width direction in comparison with the lateral wall of the lateral tank part on the inner side in the vehicle width direction. Therefore, a plane for mounting the fuel pump can be easily ensured, and the fuel pump can be arranged without increasing a width of the tank. For this reason, sealability between the rear fuel tank and the fuel pump can be ensured by a simple sealing structure.

The fuel pump is mounted to the fuel pump mounting part formed on the upper surface of the front tank part, and the upwardly swelling part that swells upward from the upper surface of the front tank part is formed behind the fuel pump mounting part. Thereby, rigidity around the fuel pump mounting part is improved, and the sealability between the rear fuel tank and the fuel pump is more easily ensured.

The inside of the upwardly swelling part is made to serve as the fuel space. Thereby, tank capacity can be increased. Also, the upwardly swelling part is formed to have the width larger than the width of the rear wheel. Thereby, mud or the like scattered from the rear wheel can be suppressed from being scattered to a front side.

The battery is provided above the upper surface of the front upper part and in front of the upwardly swelling part. Thereby, the battery can be arranged using a dead space above the front tank part.

The upwardly swelling part swells upward beyond the battery. Thereby, the mud or the like scattered from the rear wheel can be suppressed from intruding into the battery.

The battery tray is provided for supporting the battery, and the front part of the battery tray is supported by the air cleaner arranged in front of the battery. Thereby, an exclusive member for supporting the battery tray can be reduced.

The fuel pump is offset to either the right side or the left side from the centerline of the rear wheel in the vehicle width direction, and the battery is arranged on the other side in order not to overlap with the fuel pump mounting part when viewed from above. Thereby, the fuel pump and the battery can be arranged distributedly on the right side and the left side, and the battery can be arranged to be lowered. For this reason, the above-described structure contributes to lowering of the center of gravity.

The recessed part that is recessed upward while avoiding the chain for transmitting driving force to the rear wheel is formed in the bottom part on either the right side or the left side of the rear fuel tank, and the fuel pump is arranged in the position located on the other side of the right side and the left side of the rear fuel tank and not overlapping with the recessed part when viewed from above. Thereby, the remaining amount of fuel that cannot be sucked by the fuel pump can be reduced.

DETAILED DESCRIPTION

A motorcycle according to certain embodiments of the present invention will be described below with reference to drawings. Note that in the explanation, description of directions such as front and rear, right and left, and upper and lower is the same as that in each direction with respect to a vehicle body unless otherwise especially described. Also, note that in each of the drawings, a reference sign FR is indicative of a front side of the vehicle body, a reference sign UP is indicative of an upper side of the vehicle body, and a reference sign LF is indicative of a left side of the vehicle body.

Figure 1:
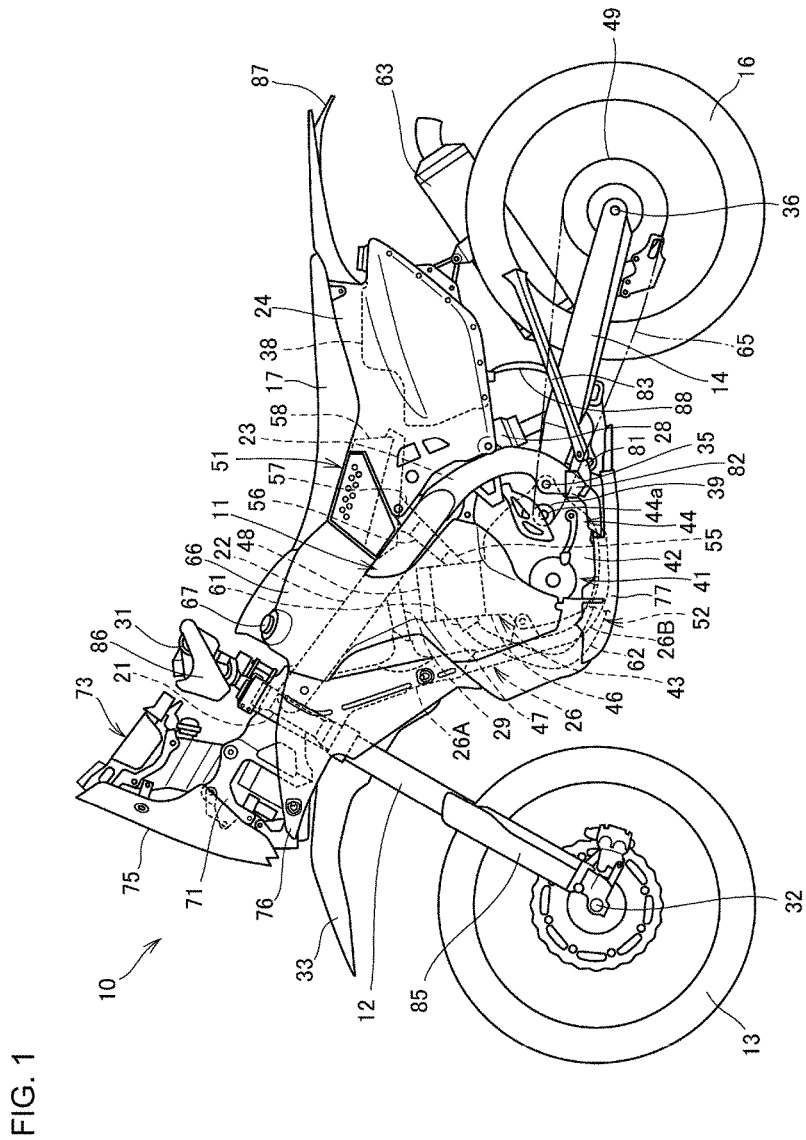
FIG. 1 is a left side view of a motorcycle according to an embodiment of the present invention.

FIG. 1 is a left side view of a motorcycle 10 according to certain embodiments of the present invention.

The motorcycle 10 can be, in this example, a rally saddle-ride type vehicle configured in such a manner that a front wheel 13 is supported at a front end of a vehicle body frame 11 through a front fork 12, a rear wheel 16 is supported below the vehicle body frame 11 through a swing arm 14, and a seat 17 is supported above the vehicle body frame 11.

The vehicle body frame 11 is a portion as a framework of the motorcycle 10, and is provided with a head pipe 21, a pair of right and left main frames 22, a pair of right and left center frames 23 (also referred to as pivot frames), a rear frame 24, and a down frame 26. Note that the vehicle body frame 11 excluding the rear frame 24 is made of metal material, and the rear frame 24 is formed of resin material.

The head pipe 21 composes the front end of the vehicle body frame 11, and the front fork 12 is steerably supported by the head pipe 21. The front fork 12 has an upper end attached with a handlebar 31, a lower end with the front wheel 13 supported through an axle 32, and an intermediate part in a longitudinal direction attached with a front fender 33 for covering the front wheel 13 from above.

The pair of right and left main frames 22 linearly extends rearward and obliquely downward from the head pipe 21 in a side view. The pair of right and left center frames 23 extends downward from rear ends of the main frames 22, and supports the front end of the swing arm 14 in a vertically swingable manner through a pivot shaft 35. A rear cushion unit 28 is interposed between the swing arm 14 and the main frames 22. The respective center frames 23 are substantially arcuately curved so as to project rearward, so that the pivot shaft 35 is supported in a position situated nearer a lower side in relation to a portion curved most rearward. The rear wheel 16 is supported at a rear end of the swing arm 14 through an axle 36.

The rear frame 24 is attached to the pair of right and left main frames 22 and the pair of right and left center frames 23, extends rearward with respect to these frames 22 and 23, supports the seat 17, and also supports a rear fuel tank 38.

The down frame 26 is composed of a down frame upper part 26A composing an upper part, and a pair of right and left down frame lower parts 26B composing a lower part.

The down frame upper part 26A extends substantially downward at a steeper angle than the main frame 22 from the head pipe 21. The down frame lower parts 26B extend from a lower end of the down frame upper part 26A so as to extend downward in the side view, and are branched into a right side and a left side. The right and left branched portions of the down frame lower parts are further curved, substantially horizontally extend rearward, and are connected to lower ends of the respective center frames 23. A reinforcing frame 29 directed in a front downward direction extends between the main frames 22 and the down frame upper part 26A, so that rigidity of a front part of the vehicle body frame 11 is increased.

An engine 41 is supported on the main frames 22. The engine 41 is supported also on the center frames 23 and the down frame 26. Also, a pair of right and left front fuel tanks 66 storing fuel (liquid fuel) supplied to the engine 41 is supported on the main frames 22. The pair of right and left front fuel tanks 66 is formed as a large-sized fuel tank that extends downward from upper sides of the main frames 22 so as to cover both sides of the main frames 22, the down frame 26, and the engine 41. In rallying, the motorcycle travels a long distance. Therefore, the motorcycle is configured to ensure large tank capacity by the front fuel tanks 66 and the rear fuel tank 38. Note that a reference sign 67 is indicative of a fuel cap for closing filler openings for the front fuel tanks 66.

A front stay 71 projecting forward is fixed to a front part of the head pipe 21. A headlight, rally equipment 73 such as a roadbook holder, a windshield 75 and the like are supported by the front stay 71.

An upper part of the front fork 12 and an upper part of the down frame 26 are covered with a pair of right and left shrouds 76 from both sides. A front part and a lower part of the engine 41, and lower front sides of the front fuel tanks 66 are covered with a skid plate 77 so as to be protected.

A rider's step 82 and a side stand 83 are supported below the center frames 23 through a step bracket 81.

Also, in FIG. 1, a reference sign 85 is indicative of a pair of right and left fork covers for covering the lower part of the front fork 12 from a front side, a reference sign 86 is indicative of a grip guard for covering each grip of the handlebar 31 from the front side, a reference sign 87 is indicative of a rear fender for covering the rear wheel 16 from above, and a reference sign 88 is indicative of a mud guard arranged in front of the rear wheel 16.

The engine 41 is provided with a crankcase 42, and a cylinder part 43 extending upward from a front upper part of the crankcase 42, and a transmission 44 is annexed to a rear part of the crankcase 42.

The cylinder part 43 is provided with a cylinder block 46 attached to the crankcase 42, a cylinder head 47 attached to an upper end of the cylinder block 46, and a head cover 48 for closing an upper opening formed in the cylinder head 47.

The cylinder block 46 has a lower part inserted into the crankcase 42, and is formed with a cylinder hole so that a piston (not shown) is vertically movably inserted therein.

The cylinder head 47 has a rear surface connected with an intake device 51, and a front surface connected with an exhaust system 52.

Figure 2:
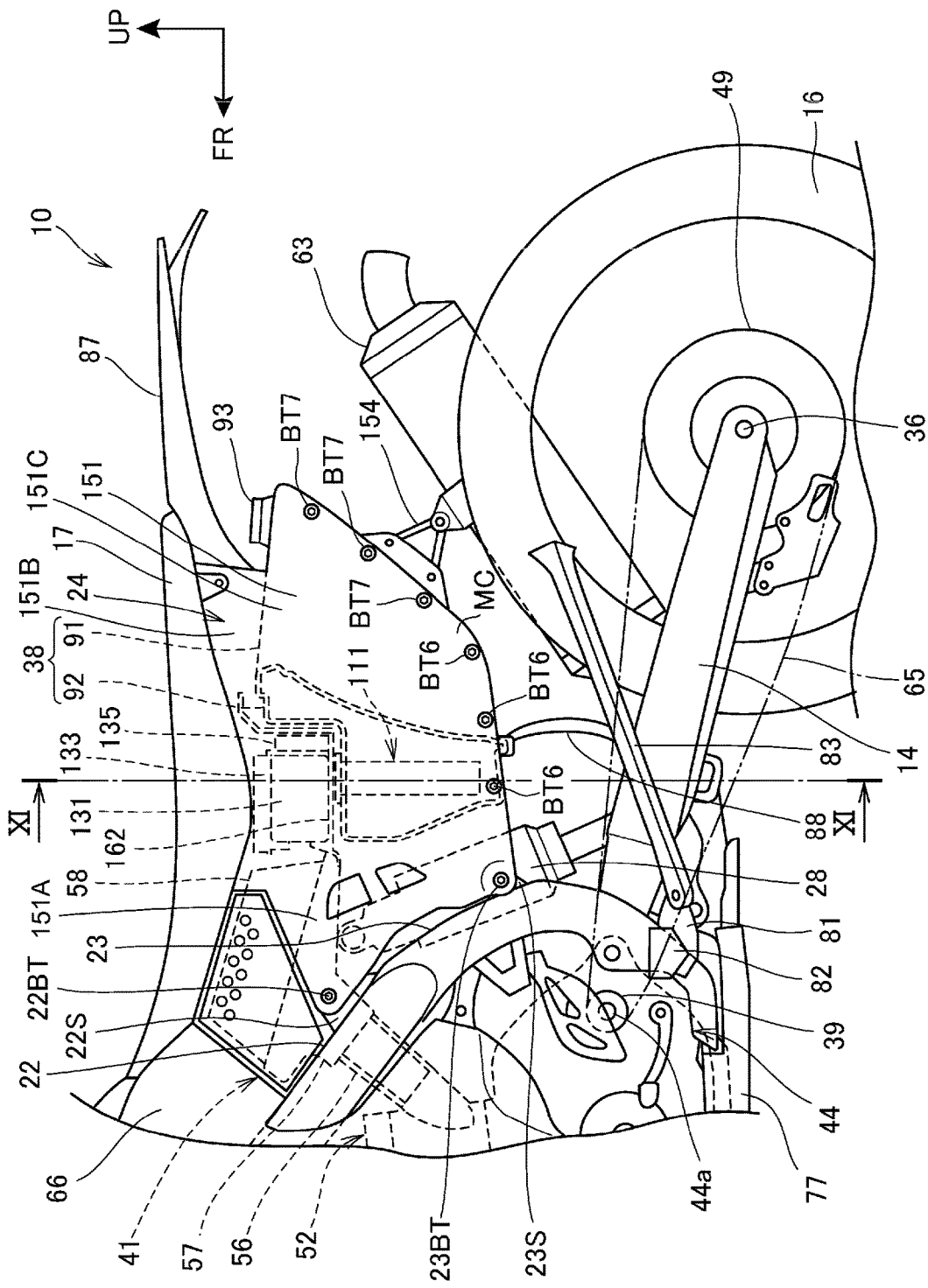
FIG. 2 is a view with a rear part of the motorcycle viewed from a left side.
Figure 3:
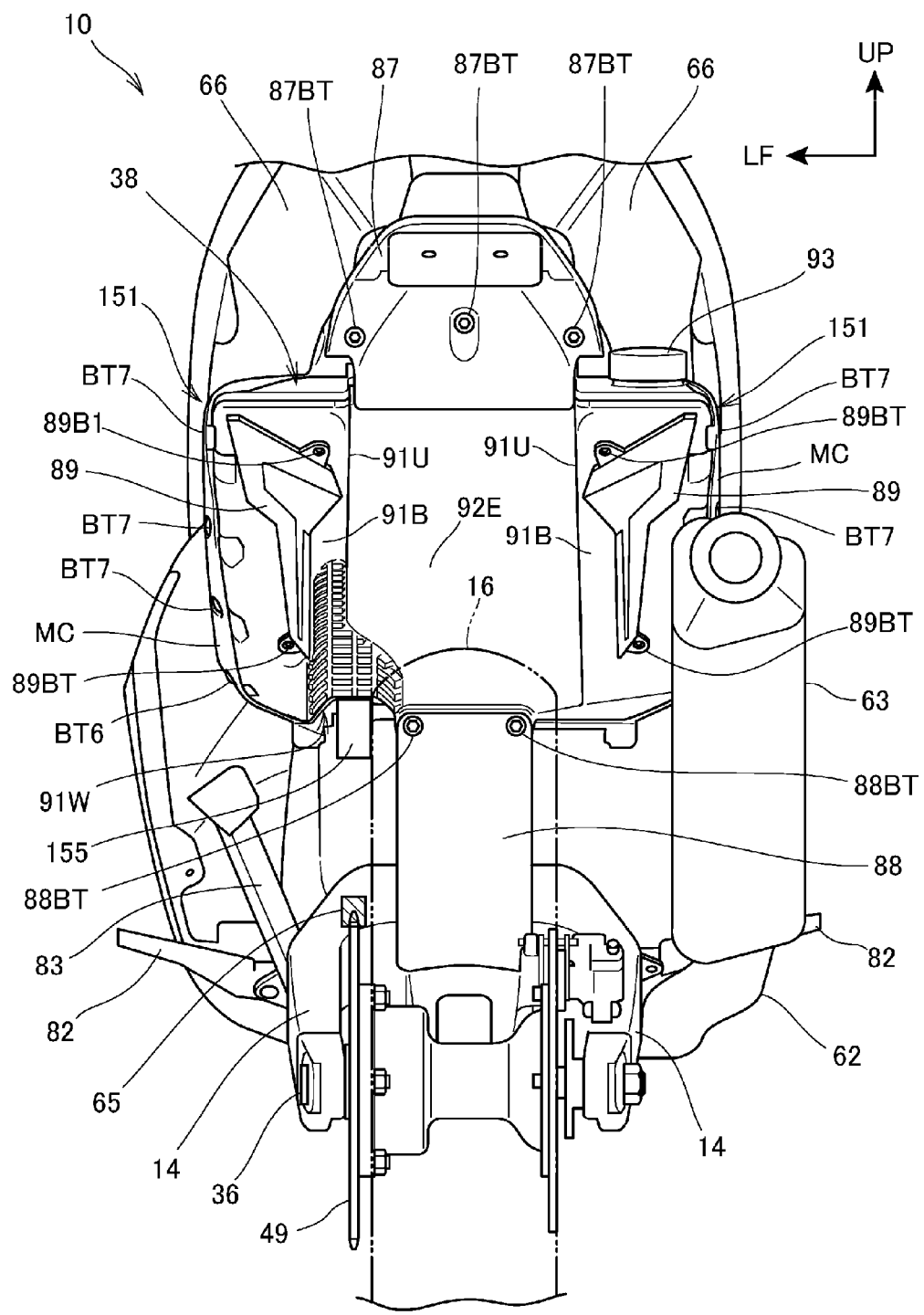
FIG. 3 is a view with the motorcycle viewed from a rear side.

FIG. 2 is a view with a rear part of the motorcycle 10 viewed from a left side, and FIG. 3 is a view with the motorcycle 10 viewed from a rear side.

The intake device 51 is provided with an intake pipe 55 extending rearward from the cylinder head 47, a throttle body 56 provided at a rear end of the intake pipe 55, and an air cleaner 58 connected to a rear end of the throttle body 56 through a connecting tube 57.

The air cleaner 58 is supported on the center frames 23 by using a vacant space formed above the pair of right and left center frames 23 and the rear cushion unit 28 and below the seat 17. A front surface of the air cleaner 58 is arranged close to back surfaces of the front fuel tanks 66. The intake pipe 55, the throttle body 56, and the connecting tube 57 that are connected sequentially from the cylinder head 47 substantially linearly extend rearward and obliquely upward and are connected to the air cleaner 58.

Referring to FIG. 1, the exhaust system 52 is provided with an exhaust pipe 62 having a tip end connected to an exhaust manifold 61 located at the front of the cylinder head 47, and a muffler 63 connected to a rear end of the exhaust pipe 62. The exhaust pipe 62 extends downward and obliquely forward from the exhaust manifold 61, is further curved rightward in a vehicle width direction and rearward, extends rearward along a right lower part of the vehicle body, and is connected to the muffler 63 on a right side of the swing arm 14.

An output shaft 44a of the transmission 44 is attached with a drive sprocket 39. A chain 65 is laid between the drive sprocket 39 and a driven sprocket 49 provided integrally with the rear wheel 16, and driving force is transmitted from the transmission 44 to the rear wheel 16.

Figure 4:
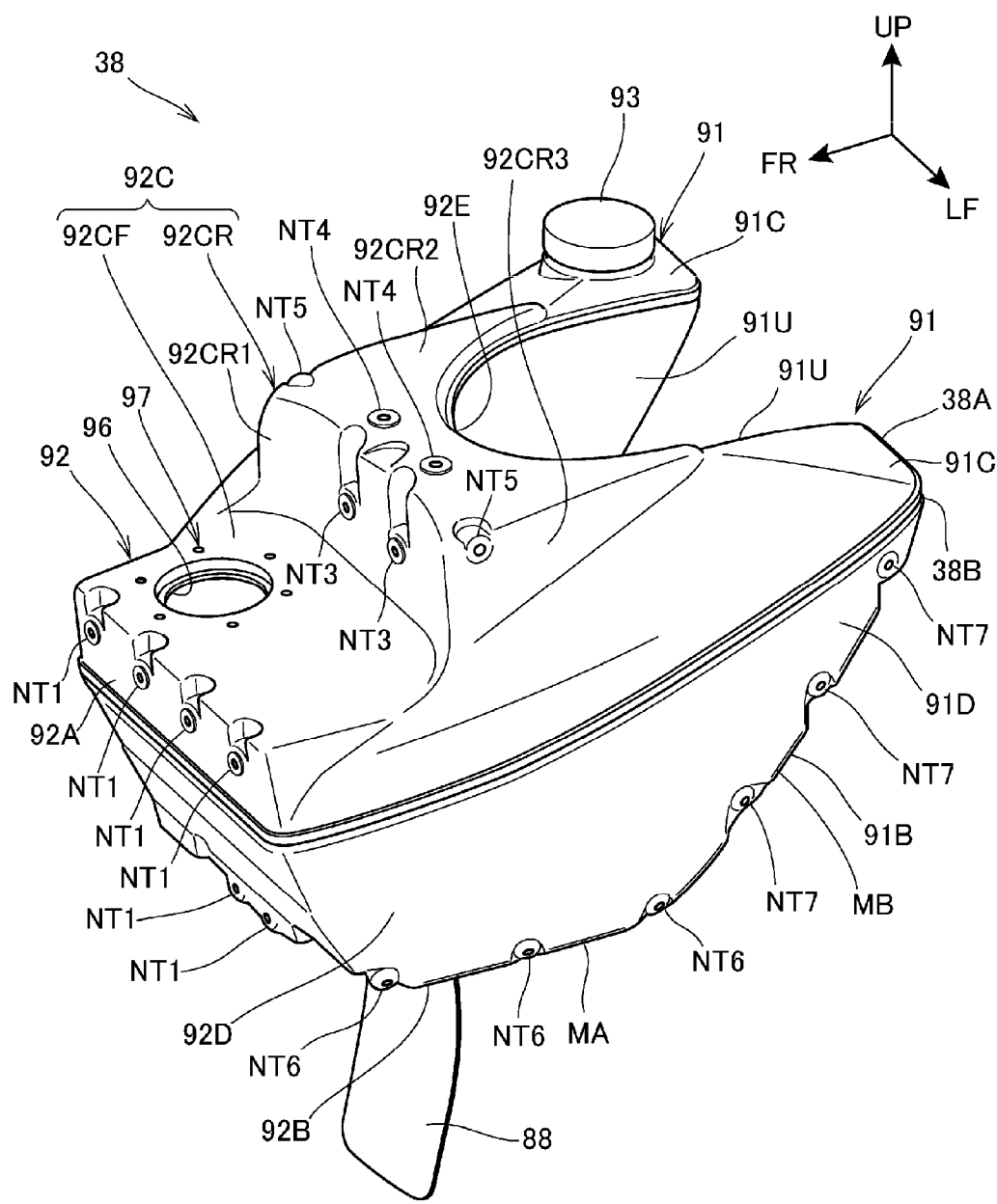
FIG. 4 is a perspective view of a rear fuel tank.

FIG. 4 is a perspective view of the rear fuel tank 38.

The rear fuel tank 38 is provided with lateral tank parts 91 that are provided on a right side and a left side at intervals, and a front tank part 92 that is arranged in front of the lateral tank parts 91 and that is connected to front sides of the lateral tank parts 91. The rear fuel tank 38 is formed into a U-shaped fuel tank opened toward the rear side when viewed from above. The rear fuel tank 38 is formed into the U-shaped tank. For this reason, the lateral tank parts 91 can be arranged lateral to the rear wheel 16, the front tank part 92 can be arranged in front of the rear wheel 16, the rear wheel 16 can be moved forward/backward between the lateral tank parts 91 when the rear wheel 16 is upwardly moved by swinging of the swing arm 14, and a moving stroke of the rear wheel 16 can be sufficiently ensured.

The rear fuel tank 38, can be, in this example, a resin tank manufactured by molding resin material. The rear fuel tank 38 is manufactured as follows. A cover 38A integrally provided with the upper parts of the lateral tank parts 91 and an upper part of the front tank part 92, and a tank body 38B forming an upwardly opened vessel portion excluding the upper parts of the lateral tank parts 91 and the upper part of the front tank part 92 respectively, are respectively manufactured by performing injection molding with respect to the resin material. Then, the cover 38A and the tank body 38B are made to adhere to one another or are thermally welded. Note that a method for manufacturing the rear fuel tank 38 is not limited to the above-described method. Other methods, for example blow molding, may be applied.

Figure 5:
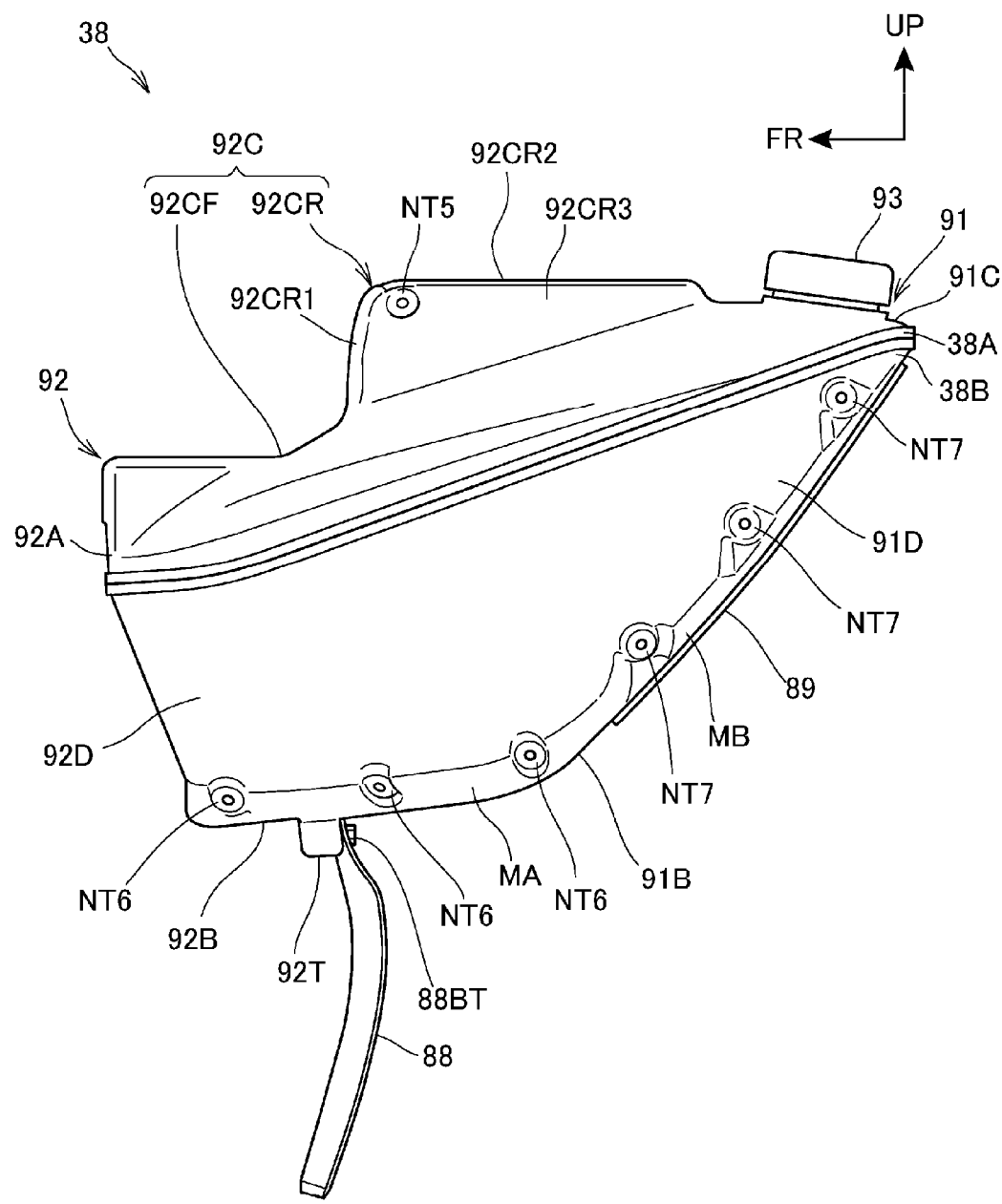
FIG. 5 is a view with the rear fuel tank viewed from a left side.
Figure 6:
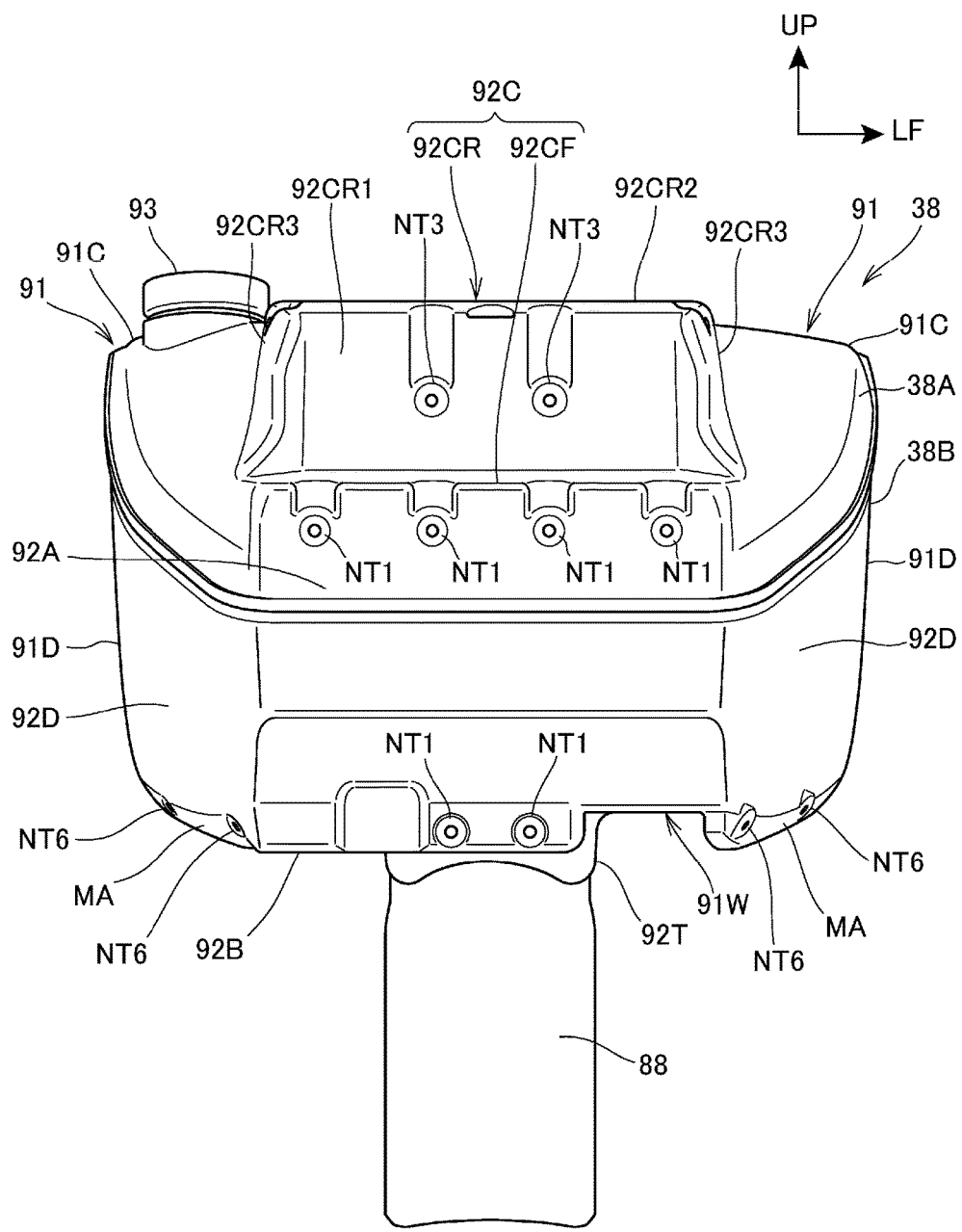
FIG. 6 is a view with the rear fuel tank viewed from a front side.
Figure 7:
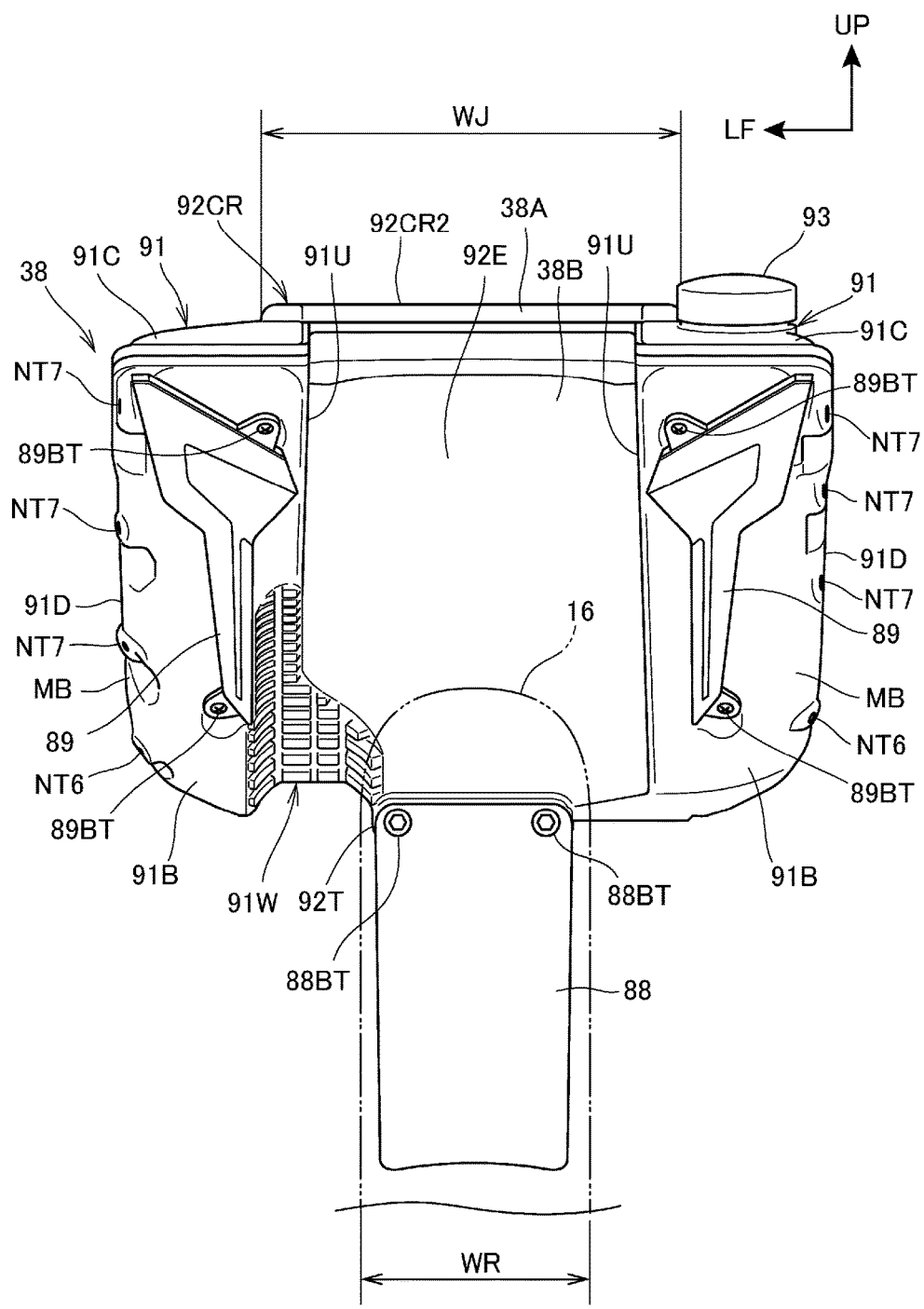
FIG. 7 is a view with the rear fuel tank viewed from a rear side.
Figure 8:
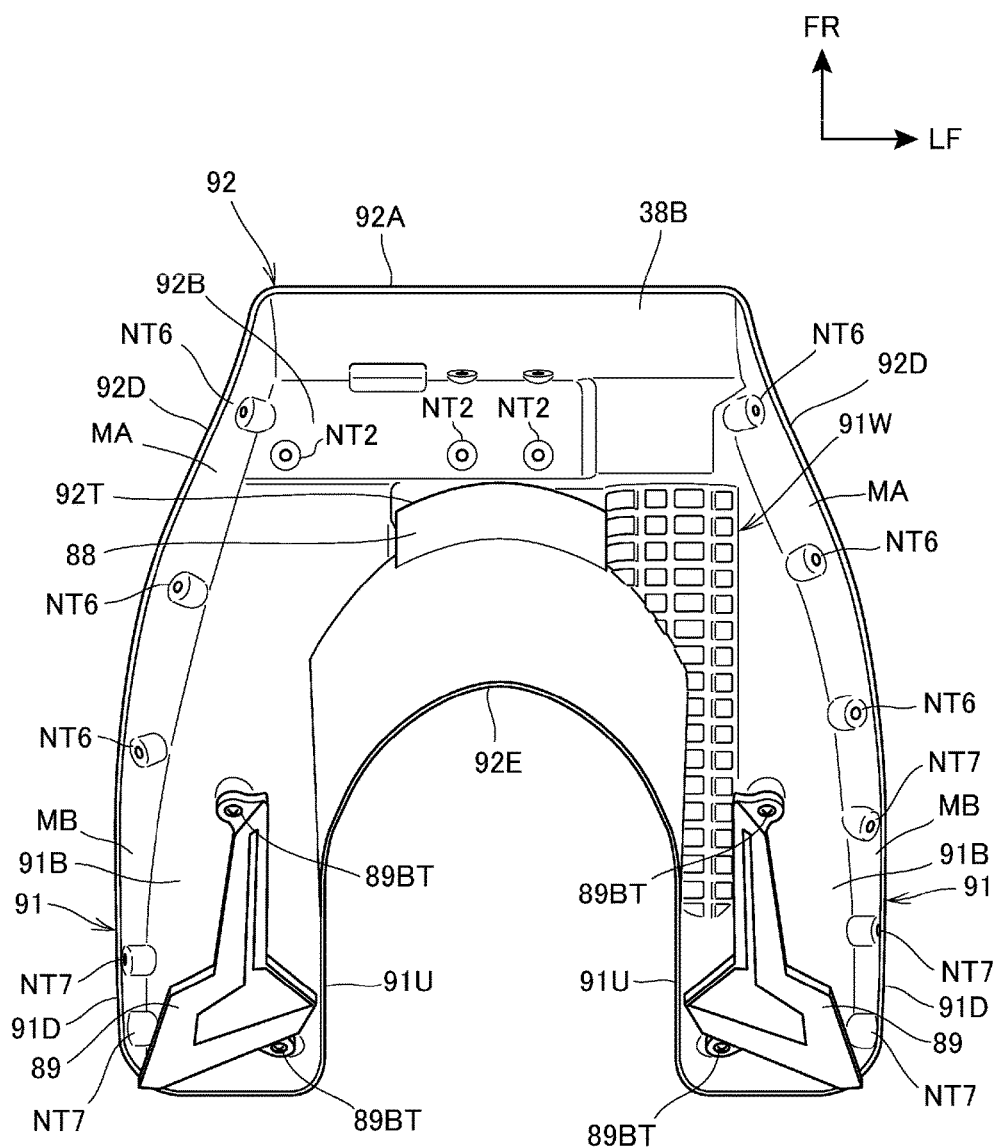
FIG. 8 is a view with the rear fuel tank viewed from a lower side.

FIG. 5 is a view with the rear fuel tank 38 viewed from a left side. FIG. 6 is a view with the rear fuel tank 38 viewed from a front side. FIG. 7 is a view with the rear fuel tank 38 viewed from a rear side. FIG. 8 is a view with the rear fuel tank 38 viewed from a lower side. Note that the rear fuel tank 38 has a substantially symmetric shape except for the filler opening and a chain relief (a recessed part 91W described later).

As shown in FIG. 4 to FIG. 8, the front tank part 92 is formed into a hollow box shape provided with a front surface part 92A, a bottom surface part 92B, an upper surface 92C, right and left lateral surface parts 92D composing lateral surfaces (side walls) on an outer side in the vehicle width direction, and a back surface part 92E. The front surface part 92A is formed to have a surface extending in a vertical direction of the vehicle body and bridging between front edges of the right and left lateral surface parts 92D.

As shown in FIG. 6, a plurality (six in total in this example) of fastened parts NT1 (female screws in the present structure) for fastening to a front cross part 153 described later of the rear frame 24 are provided in the vicinity of an upper edge of the front surface part 92A and in the vicinity of a lower edge thereof at intervals in a horizontal direction and the vertical direction.

The bottom surface part 92B is formed to have an inclined surface inclined gently rearward and upward. As shown in FIG. 8, the bottom surface part 92B is provided with a plurality (three in total) of fastened parts NT2 (female screws in the present structure) for fastening to a lower part of the front cross part 153 described later, the fastened parts NT2 being formed at intervals in the horizontal direction.

As shown in FIG. 5 and FIG. 6, the upper surface 92C of the front tank part 92 is provided integrally with a front upper surface part 92CF extending substantially horizontally from an upper edge of the front surface part 92A, and an upwardly swelling part 92CR swelling upward from a rear edge of the front upper surface part 92CF.

A front surface 92CR1 of the upwardly swelling part 92CR is formed into a surface (vertical surface) parallel to the vertical direction of the vehicle body, an upper surface 92CR2 thereof is formed into a surface (horizontal surface) substantially horizontally extending rearward of the vehicle body, and right and left lateral surfaces 92CR3 are formed into surfaces extending parallel to the longitudinal direction of the vehicle body on an inner side in the vehicle width direction in comparison with lateral surfaces (outer surfaces described later) on the outer side in the vehicle width direction of the lateral tank parts 91. A plurality of fastened parts NT3, NT4, NT5 (female screws in the present structure) for fastening to an upper cross part 152 described later of the rear frame 24 are respectively provided to the front surface 92CR1, the upper surface 92CR2 and the lateral surfaces 92CR3 of the upwardly swelling part 92CR.

As shown in FIG. 4, FIG. 7, and FIG. 8, the back surface part 92E of the front tank part 92 is formed into a curved surface that is curved into a forwardly projecting U shape, so that a substantially constant clearance is ensured between the back surface part 92E and the rear wheel 16 entered between the right and left lateral tank parts 91. A mud guard mounting part 92T for mounting the mud guard 88 from behind is provided to a lower part of the back surface part 92E. The mud guard 88 is mounted to the mud guard mounting part 91A through fastening members 88BT (fastening bolts in the present structure).

As shown in FIG. 6 and FIG. 8, the right and left lateral surface parts 92D of the front tank part 92 are formed into inclined surfaces spreading outward in the vehicle width direction from the right and left side edges of the front surface part 92A toward the rear side of the vehicle body.

In the present structure, as shown in FIG. 5 and FIG. 6, lower edges of the right and left lateral surface parts 92D are formed into bent surfaces MA that are gently inclined to an inner side of the vehicle body and that are coupled to the bottom surface part 92B. As viewed from the front side of the vehicle body, the bent surfaces MA are formed into inclined surfaces that are inclined downward on the inner side in the vehicle width direction.

The respective bent surfaces MA are provided with a plurality (three in FIG. 5) of fastened parts NT6 (female screws in the present structure) that are provided for fastening to side panel parts 151 described later of the rear frame 24 and that are respectively provided at intervals in the longitudinal direction.

The lateral tank parts 91 are provided integrally with bottom surface parts 91B, upper surface parts 91C, right and left lateral surface parts 91D (hereinafter referred to as outer surface parts) composing lateral surfaces (side walls) on the outer side in the vehicle width direction, and right and left lateral surface parts 91U (hereinafter referred to as inner surface parts) composing lateral surface (side walls) on the inner side in the vehicle width direction.

The bottom surface parts 91B of the lateral tank parts 91 are formed to have inclined surfaces that are continuous with the rear edge of the bottom surface part 92B of the front tank part 92 and that extend upward to the rear at the steeper angle than the bottom surface part 92B. The taillights 89 are respectively mounted to the right and left bottom surface parts 91B. Note that in FIG. 7, a reference sign 89BT is indicative of each of fastening members (fastening bolts in the present structure) for fixing the taillights 89.

The upper surface parts 91C of the lateral tank parts 91 extend rearward while being continuous with the rear edge of the upper surface 92C (including the upwardly swelling part 92CR) of the front tank part 92, and are connected to the rear edges of the bottom surface parts 91B. As shown in FIG. 4 and FIG. 5, the upper surface parts 91C of the lateral tank parts 91 are provided in relatively high positions in the rear fuel tank 38, the filler opening is formed in the position of one (right side) of the right and left lateral tank parts 91 at the rear end of the upper surface 92C, and the filler opening is closed with a fuel cap 93.

The outer surface parts 91D of the lateral tank parts 91 are formed with respect to the side walls that are continuous with the rear edges of the right and left lateral surface parts 92D of the front tank part 92 and that extend rearward of the vehicle body, and an extending direction thereof is substantially parallel to the longitudinal direction of the vehicle body. With regard to the outer surface parts 91D, in the same way as the right and left lateral surface parts 92D of the front tank part 92, the lower edges of the outer surface parts 91D are formed into bent surfaces MB that are gently inclined to the inner side of the vehicle body and that are continuous with the bottom surface parts 91B. As viewed from the front side of the vehicle body, the bent surfaces MB are formed into inclined surfaces that are inclined downward on the inner side in the vehicle width direction.

The bent surfaces MB are also formed with a plurality (three in FIG. 5) of fastened parts NT7 (female screws in this example of the present invention) for fastening to the side panel parts 151 of the rear frame 24.

In this way, in the rear fuel tank 38, as shown in FIG. 5, the bent surfaces MA, MB are provided, the bent surfaces being continuous with each other along the lower edges on the outer side in the vehicle width direction. The bent surfaces MA, MB are provided with the plurality of fastened parts NT6 and NT7 that are formed of the female screws and provided at intervals.

As shown in FIG. 8, the inner surface parts 91U of the lateral tank parts 91 are formed with respect to side walls that are continuous with the rear edge of the forwardly projecting back surface part 92E of the front tank part 92 and that extend rearward of the vehicle body, and the extending direction thereof is substantially parallel to the longitudinal direction of the vehicle body. For this reason, the clearance between the inner surface parts 91U of the lateral tank parts 91 and the rear wheel 16 can be kept constant.

As shown in FIG. 7, in the lateral tank part 91, the recessed part 91W that is recessed upwardly is formed in a region opposed to the chain 65 (FIG. 2 and FIG. 3) as a power transmission member for transmitting the driving force to the rear wheel 16. The recessed part 91W extends in the longitudinal direction over the inner surface part 91U and the bottom surface part 91B of the left lateral tank part 91, and also a reinforcing rib is provided in the region with the recessed part 91W formed. For this reason, a sufficient clearance can be endured between the recessed part 91W and the chain 65, and also the region opposed to the chain 65 can be reinforced.

As shown in FIG. 4, the upper surface 92C of the rear fuel tank 38 is provided with a pump opening 96, and fuel pump mounting parts 97 (female screws in the present structure, see FIG. 4) provided around the pump opening 96 at intervals. More specifically, the pump opening 96 is a hole that is formed in the front upper surface part 92CF of the front tank part 92 and that is opened upward, and the fuel pump mounting parts 97 are the female screws that are formed at constant intervals along the outer edge of the pump opening 96.

A fuel pump 111 (FIG. 9) is mounted using these pump opening 96 and fuel pump mounting parts 97. A perimeter structure including the fuel pump 111 will be described below.

Figure 9:
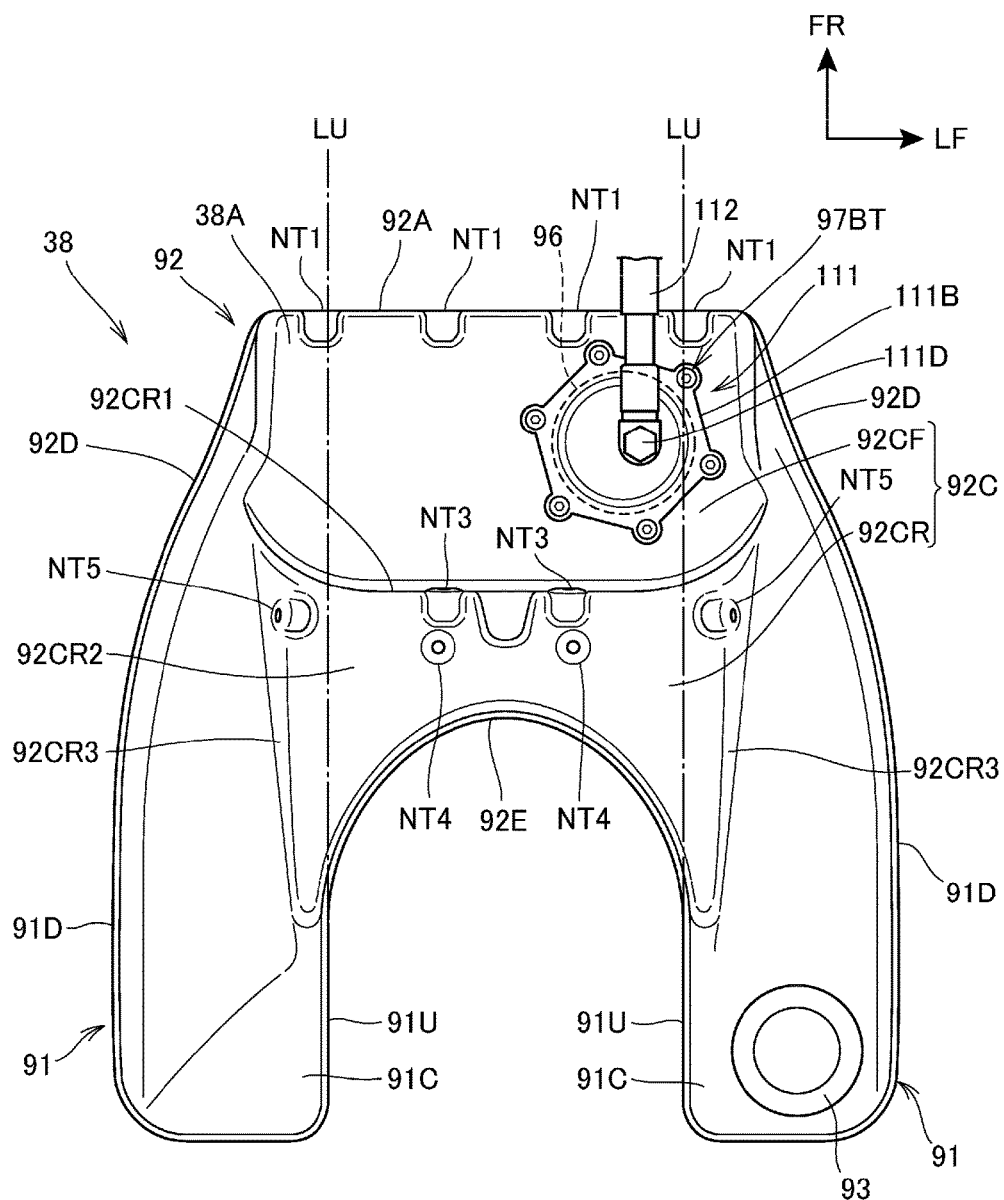
FIG. 9 is a view with the rear fuel tank viewed together with a fuel pump from an upper side.
Figure 10:
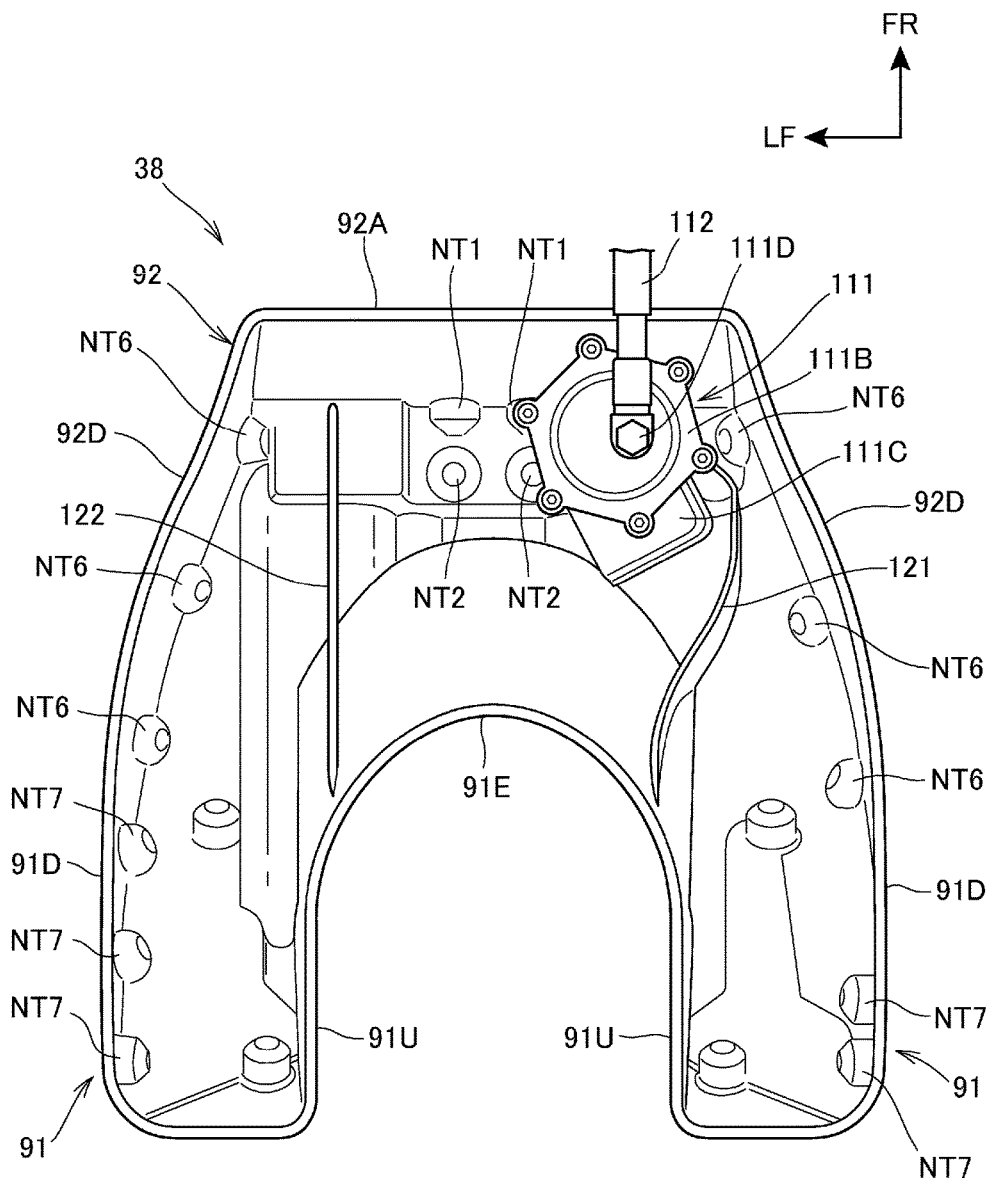
FIG. 10 is a view showing the fuel pump and an internal structure of the rear fuel tank.
Figure 11:
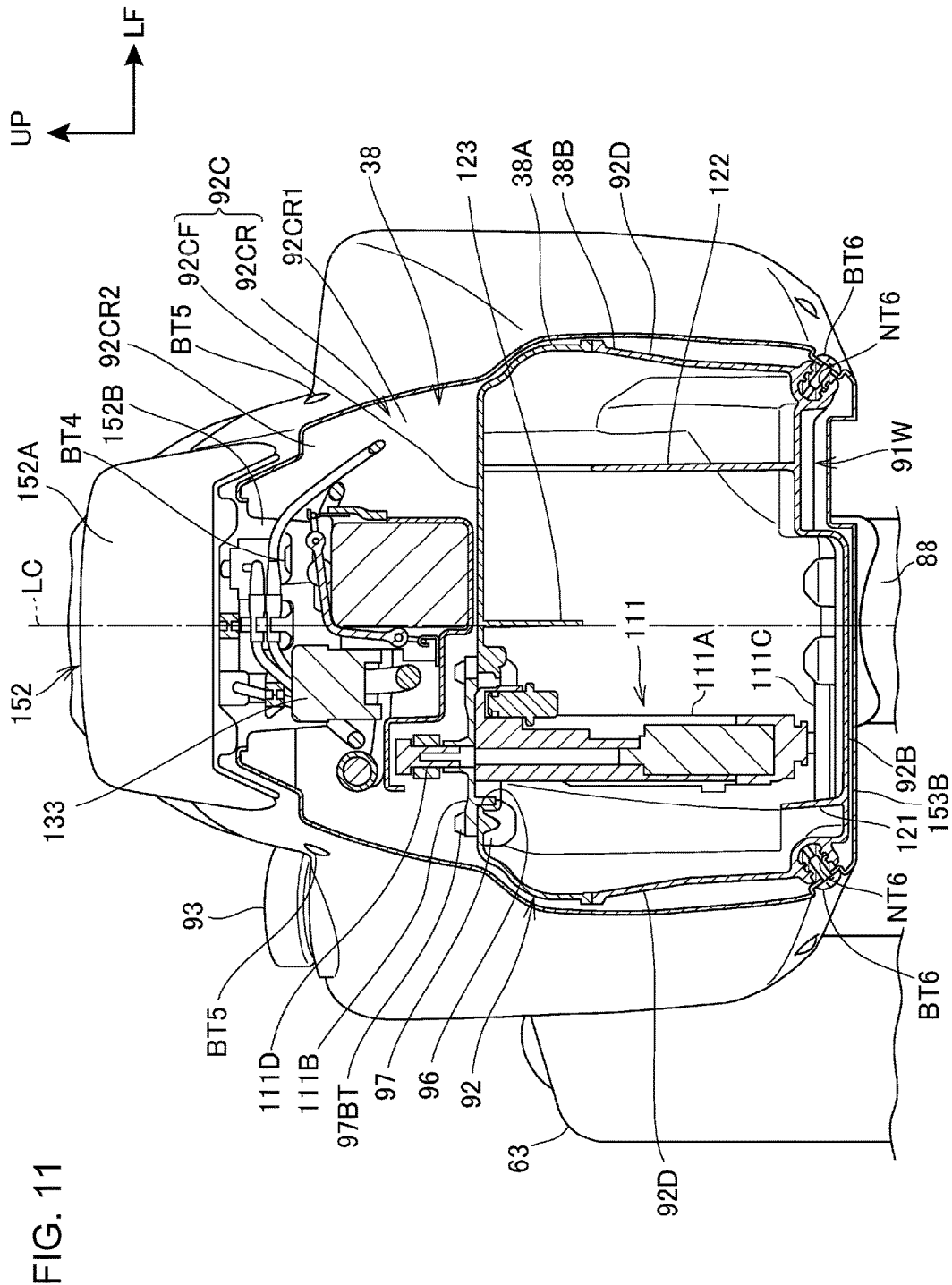
FIG. 11 is a cross-sectional view showing the fuel pump together with a perimeter structure.

FIG. 9 is a view with the rear fuel tank 38 viewed together with the fuel pump 111 from an upper side, FIG. 10 is a view showing an internal structure of FIG. 9, and FIG. 11 is a cross-sectional view (equivalent to the cross-sectional surface taken along line XI-XI) showing the fuel pump 111 together with the perimeter structure. Note that in FIG. 11, a reference sign LC is indicative of a centerline in the vehicle width direction.

As shown in FIG. 9 to FIG. 11, the fuel pump 111 is provided integrally with a pump unit 111A (FIG. 11) having a vertically long cylindrical shape, and a flange part 111B extending outward in a radial direction from an upper part of the pump unit 111A. The pump unit 111A is inserted into the pump opening 96, and the flange part 111B is formed to have a diameter larger than that of the pump opening 96 and is fastened to the fuel pump mounting parts 97 through a plurality of fastening members 97BT (fastening bolts in the present structure). For this reason, with the pump unit 111A arranged in the front tank part 92, the fuel pump 111 is fastened and fixed to the front tank part 92.

The pump unit 111A extends downward toward the bottom surface part 92B of the front tank part 92, and has a strainer (also referred to as a filter unit) 111C (FIG. 10) provided at a lowermost end of the pump unit 111A. The pump unit 111A is configured such that the fuel in the rear fuel tank 38 is sucked through the strainer 111C, so that the fuel is sucked while removing foreign matter and is delivered at a predetermined pressure.

The flange part 111B is provided with a fuel discharge pipe 111D projecting upward, and the fuel delivered by the pump unit 111A is discharged to the outside through the fuel discharge pipe 111D. The fuel discharge pipe 111D is connected with a fuel pipe 112, and the fuel is fed to a fuel supply system of the engine 41 through the fuel pipe 112.

As shown in FIG. 4, in the present structure, the pump opening 96 is formed in the upper surface 92C of the front tank part 92 wider than the upper surface of each of the lateral tank parts 91. For this reason, a plane for mounting the fuel pump 111 can be easily ensured. If trying to form the pump opening 96 in either lateral tank part 91, this creates a need to increase the width of either lateral tank part 91 to the width equal to or larger than the width of the flange part 111B, thereby causing an increase in the width of the rear fuel tank 38.

In contrast, since the pump opening 96 is formed in the upper surface 92C of the front tank part 92, the plane for mounting the fuel pump 111 is easily endured so that the fuel pump 111 can be mounted, and the width of either lateral tank part 91 can be freely set. For this reason, the width of either tank part 91 has only to be set based on conditions such as the desired tank capacity and the desired vehicle width dimension.

The case that the pump opening 96 is formed in the upper surface 92C of the front tank part 92 brings such an advantage that the degree of freedom in a position of the pump opening 86 is increased.

Note that reference signs LU in FIG. 9 are indicative of lines with the right and left inner surface parts 91U of the lateral tank parts 91 extending forward of the vehicle body. In the present structure, as is evident in FIG. 9, the pump opening 96 is separated inward in the vehicle width direction from the right and left lateral surface parts 92D of the front tank part 92, so that the pump opening 96 is provided inward in the vehicle width direction in comparison with the right and left inner surface parts 91U of the lateral tank parts 91 and the fuel pump 111 is arranged inward in the vehicle width direction in comparison with the right and left lateral surface parts 92D.

With this structure, the fuel pump 111 can be arranged avoiding a joint part between the lateral tank parts 91 and the front tank part 92, the joint part being easily deformed when receiving a load. With this arrangement, in comparison with the case that the fuel pump 111 is arranged in a position easily deformed by receiving the load, sealability between the rear fuel tank 38 and the fuel pump 111 can be ensured by a simple sealing structure.

The fuel pump mounting parts 97 are provided to the substantially horizontally extending front upper surface part 92CF of the front tank part 92, and the upwardly swelling part 92CR swelling upward from the upper side of the front tank part 92 is positioned behind the fuel pump mounting parts 97. For this reason, the rigidity around the fuel pump mounting parts 97 is increased, and the sealability between the rear fuel tank 38 and the fuel pump 111 is more easily ensured.

The inside of the upwardly swelling part 92CR is hollowed. For this reason, an internal space of the rear fuel tank 38 can be extended by the part of the upwardly swelling part 92CR, and the tank capacity can be increased.

Here, as shown in FIG. 7, a width WJ of the upwardly swelling part 92CR is increased outward in the vehicle width direction in comparison with the back surface part 92E formed into a forwardly projecting shape of the front tank part 92, and is formed to have a width larger than a width WR of the rear wheel 16. For this reason, large tank capacity can be ensured, and also forward scattering of mud or the like scattered from the rear wheel 16 between the right and left lateral tank parts 91 can be blocked. Therefore, the scattering of the mud or the like to a side of the fuel pump 111 can be avoided by the upwardly swelling part 92CR.

As shown in FIG. 11, the fuel pump 11 is offset to one (the right side in the present structure) of the right side and the left side with respect to the centerline LC in the vehicle width direction of the rear wheel 16. The side with the fuel pump being offset is a side opposite to the chain 65 arranged on one of the right side and the left side of the rear wheel 16. For this reason, the fuel pump 111 can be arranged in the position avoiding the upwardly projecting recessed part 91W formed in the bottom surface part 92B of the rear fuel tank 38.

With this arrangement, the strainer 111C composing the fuel suction opening of the fuel pump 111 can be set in a position lower than the case that the fuel pump 111 is arranged on the recessed part 91W. For this reason, the remaining amount of the fuel that cannot be sucked by the fuel pump 111 (so-called the remaining amount that is unexpendable) can be reduced.

Further, as shown in FIG. 10 and FIG. 11, right and left upright walls 121, 122 arranged upright from the bottom surface part 92B of the front tank part 92 toward the upper side, and an upright wall 123 arranged upright from the front upper surface part 92CF of the front tank part 92 toward the lower side, are provided in the rear fuel tank 38.

As shown in FIG. 10, the right and left upright walls 121, 122 are formed as walls extending from the front sides of the inner surface parts 91U of the right and left lateral tank parts 91 to the vicinity of the front surface part 92A. With this arrangement, when the fuel in the lateral tank parts 91 surges forward, some of the fuel is led to flow along the upright walls 121, 122, so that the amount of fuel directly hitting against the fuel pump 111 can be reduced.

Note that the upright wall 121 on a side close to the fuel pump 111 is formed into a wall only slightly lower than the strainer 111C having the suction opening of the fuel pump 111. On the other hand, the upright wall 122 on a side away from the fuel pump 111 is formed into a wall extending upward from the recessed part 91W and higher than the strainer 111C.

The upright wall 122 on the side away from the fuel pump 111 is higher than the upright wall 121 on the side close to the fuel pump 111. For this reason, the amount of fuel from the lateral tank parts 91 on the sides away from the fuel pump 111 toward the fuel pump 111 can be sufficiently reduced.

Also, the upright wall 123 arranged upright toward the lower side is provided between the upright wall 122 on the side away from the fuel pump 111 and the fuel pump 111. With this arrangement, when the relatively large amount of fuel exists in the rear fuel tank 38, the horizontal movement of the fuel can be efficiently suppressed by the respective upright walls 122, 123. For this reason, a change in the center of gravity caused by the movement of the fuel can be suppressed.

Also, as shown in FIG. 11, a battery 131 as a relatively large-sized electric component is offset, on a side opposed to a side with the fuel pump 111 being offset to one of the right side and the left side, above the front upper surface part 92CF of the front tank part 92. When viewed from above, the battery 131 is arranged in a position as a region with the fuel pump 111 mounted, not overlapping with the pump opening 96 and the fuel pump mounting parts 97. With this arrangement, the fuel pump 111 and the battery 131 are distributedly arranged on the right side and the left side.

In comparison with the case that the battery 131 is tentatively arranged above the fuel pump 111, when the fuel pump 111 and the battery 131 are distributedly arranged on the right side and the left side, the battery 131 can be arranged to be lowered. This structure contributes to the lowering of the center of gravity of the motorcycle 10 by the part with the weighty battery 131 arranged to be lowered.

As shown in the same drawing, that is, FIG. 11, the upwardly swelling part 92CR swells upward beyond the battery 131. For this reason, the mud or the like scattered from the rear wheel 16 can be sufficiently suppressed from intruding into the battery 131.

As shown in FIG. 2, the rear frame 24 is fixed to the main frames 22 and the center frames 23 in such a manner that the rear frame 24 is fastened to first frame support parts 22S extending obliquely upward from the rear parts of the right and left main frames 22 and second frame support parts 23S extending rearward from the vertically intermediate parts of the right and left center frames 23 by fastening members 22BT, 23BT respectively.

Figure 12:
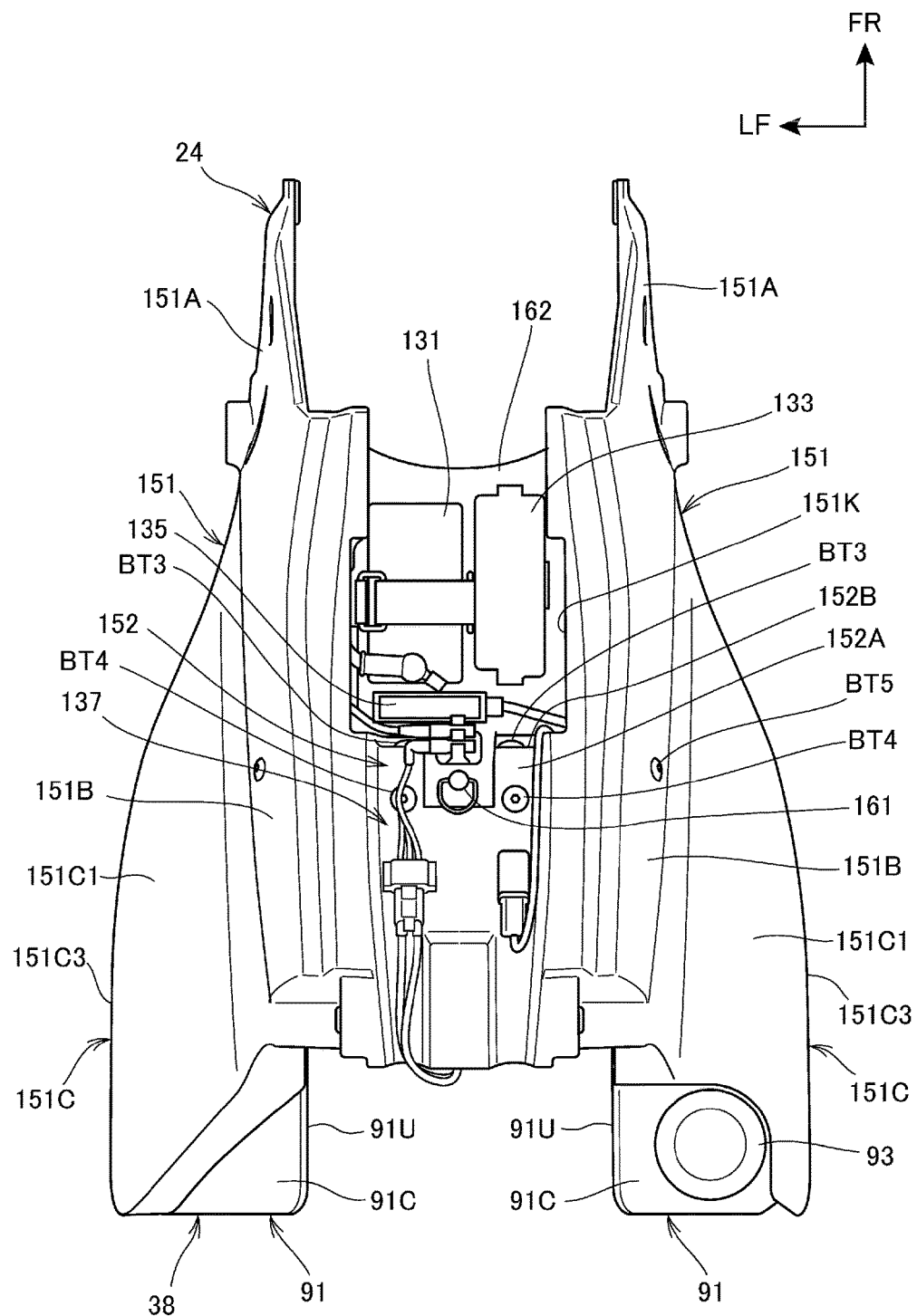
FIG. 12 is a view with a rear frame viewed together with a perimeter structure from an upper side.
Figure 13:
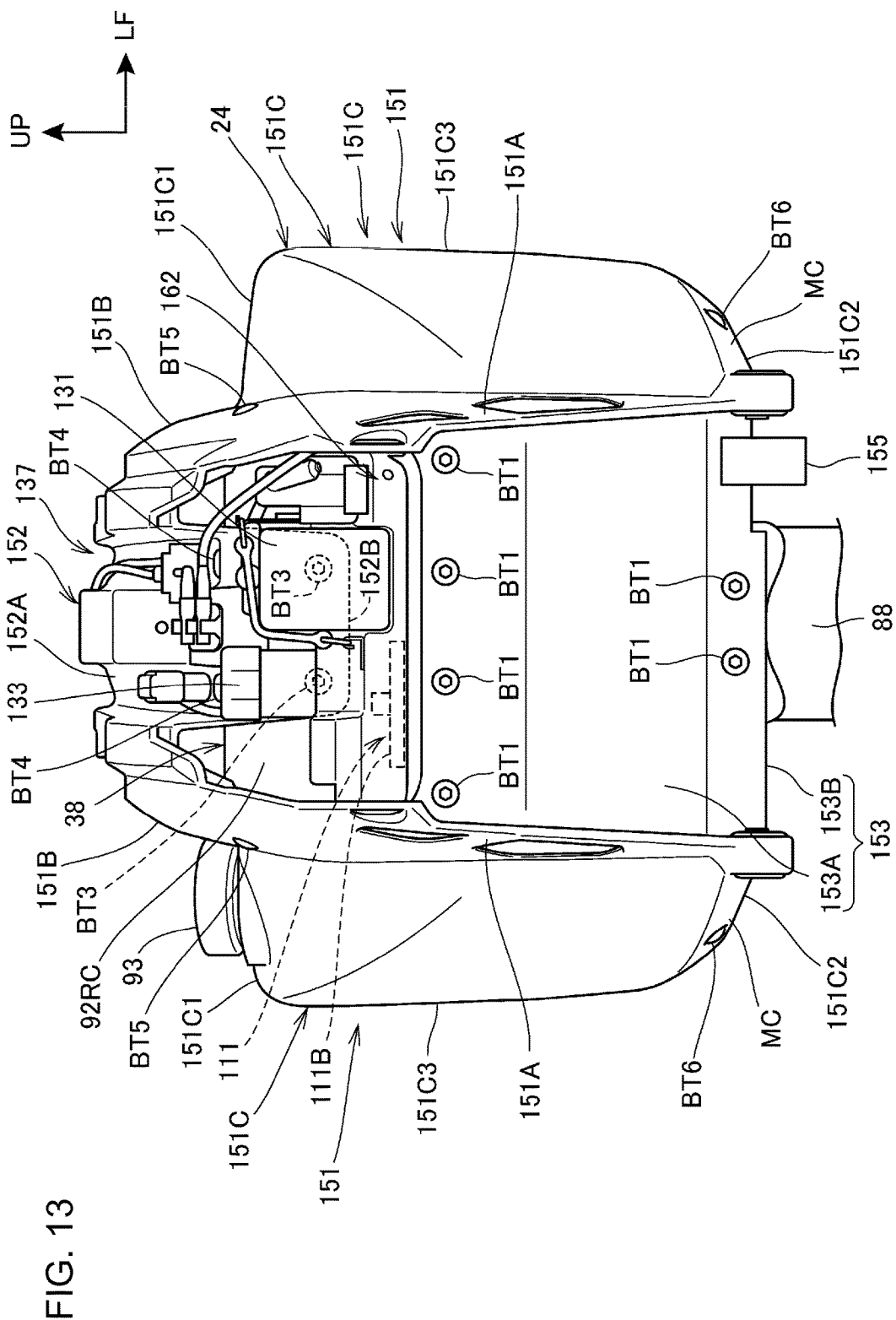
FIG. 13 is a view with the rear frame viewed together with the perimeter structure from the front side.
Figure 14:
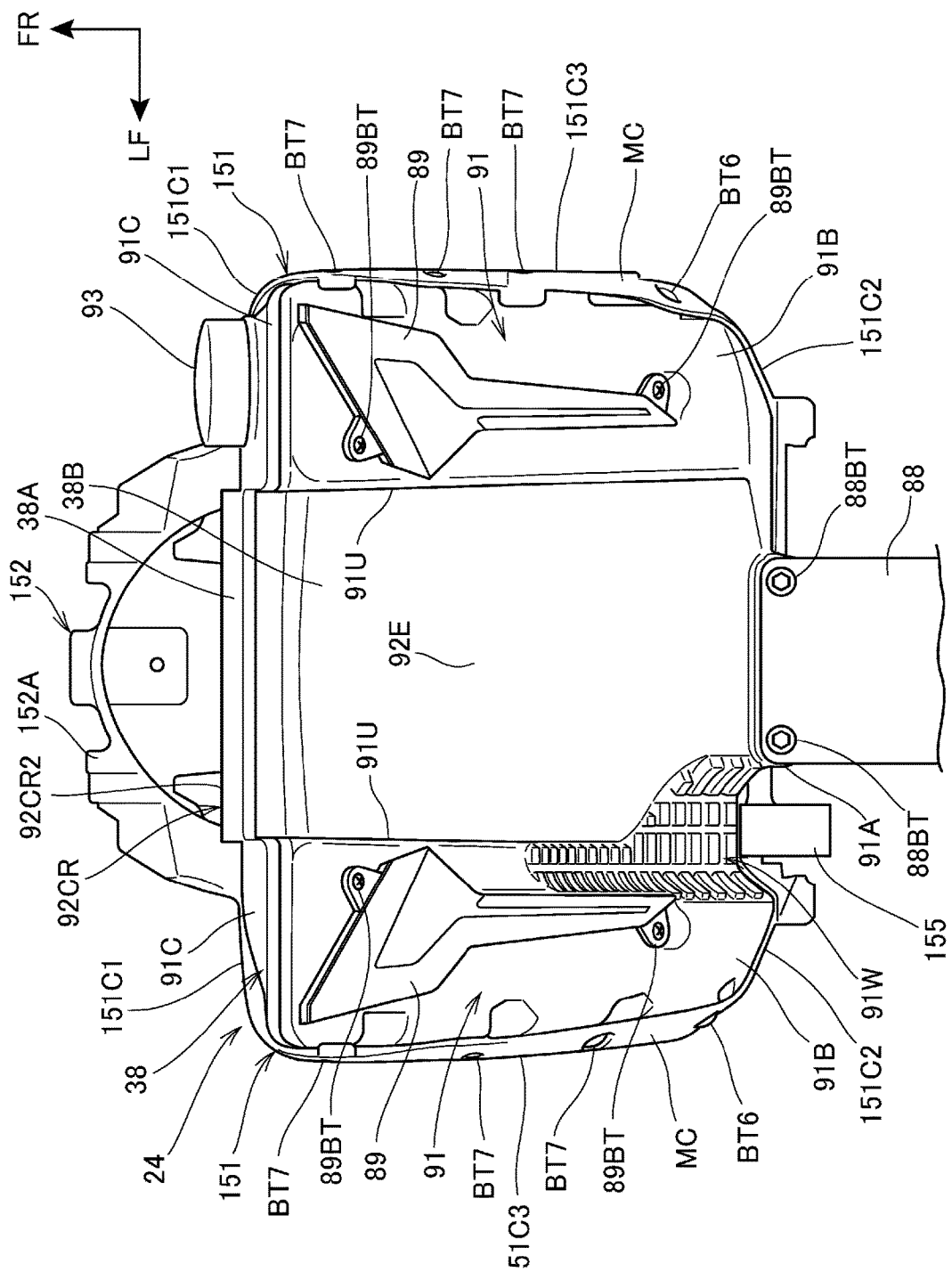
FIG. 14 is a view with the rear frame viewed together with the perimeter structure from the rear side.
Figure 15:
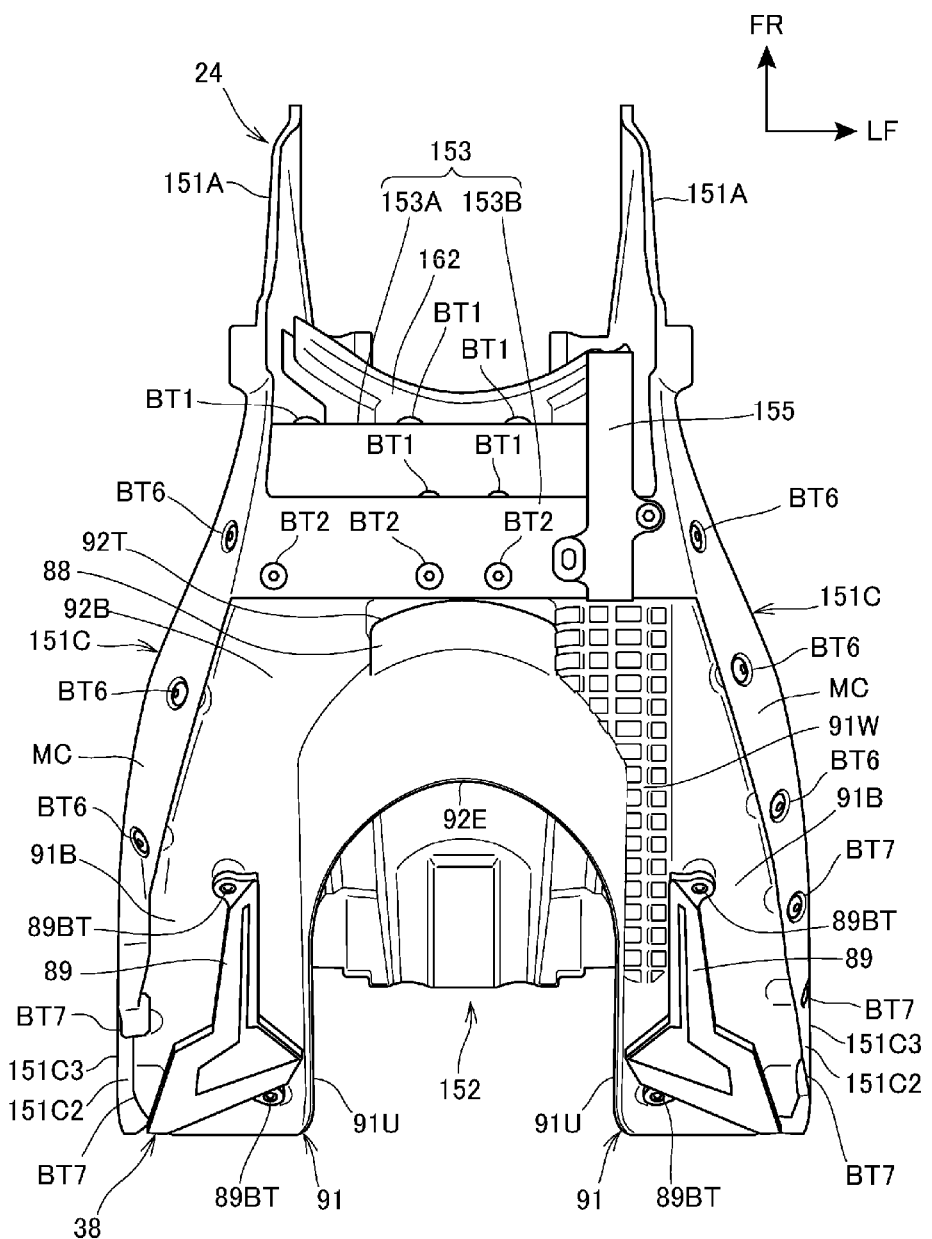
FIG. 15 is a view with the rear frame viewed together with the perimeter structure from the lower side.

FIG. 12 is a view with the rear frame 24 viewed together with the perimeter structure from the upper side, FIG. 13 is a view with the rear frame 24 viewed together with the perimeter structure from the front side, FIG. 14 is a view with the rear frame 24 viewed together with the perimeter structure from the rear side, and FIG. 15 is a view with the rear frame 24 viewed together with the perimeter structure from the lower side.

As shown in FIG. 12 to FIG. 15, the rear frame 24 is provided with right and left side panel parts 151 provided at intervals on the right side and the left side, the upper cross part 152 bridging between the upper parts of the right and left side panel parts 151, and the front cross part 153 bridging between the front parts of the right and left side panel parts 151. The rear frame 24 is formed such that the side panel parts 151, the upper cross part 152 and the front cross part 153 are integrated with each other, and is formed of carbon fiber-reinforced resin, that is, the rear frame 24 is formed as a carbon monocoque frame. Note that the rear frame 24 is formed into a symmetric shape.

As shown in FIG. 2, in the side view of the vehicle body, the side panel parts 151 are formed into a panel shape having a substantially constant vertical length and extending upward to the rear, and the front upper ends and the front lower ends of the side panel parts 151 are fixed to the first frame support parts 22S of the main frames 22 and the second frame support parts 23S of the center frames 23 through the fastening members 22BT, 23BT.

The side panel parts 151 are roughly provided integrally with side panel front parts 151A fixed to the main frames 22 and the center frames 23, side panel rear upper parts 151B connected to the upper rear sides of the side panel front parts 151A and extending rearward along the lower edge of the seat 17, and side panel rear lower parts 151C connected to the lower rear sides of the side panel front parts 151A and swelling outward in the vehicle width direction.

The side panel front parts 151A are formed into a panel shape extending parallel to the longitudinal direction of the vehicle body from the main frames 22 and the center frames 23 toward the rear side and not projecting outside of the vehicle width direction with respect to the main frames 22 and the center frames 23.

As shown in FIG. 2, the front edges of the side panel front parts 151A are curved rearward along the shapes of the main frames 22 and the center frames 23, and are arranged close to the main frames 22 and the center frames 23. With this arrangement, components (such as the rear cushion unit 28 and the air cleaner 58) arranged inside can be covered with and protected by the side panel front parts 151A.

As shown in FIG. 12 and FIG. 13, the side panel rear upper parts 151B are formed into a panel shape extending parallel to the side panel front parts 151A from the side panel front parts 151A to the rear side of the vehicle body, and do not project outside of the vehicle width direction with respect to the main frames 22 and the center frames 23. The side panel front parts 151A and the side panel rear upper parts 151B do not project outside of the vehicle width direction. For this reason, the degree of freedom in movement of legs of a rider seated on the seat 17 can be sufficiently ensured. The seat 17 is arranged on the upper surfaces of the side panel rear upper parts 151B, and also the rear fender 87 is fixed to the back surfaces of the side panel rear upper parts 151B through a plurality (three) of fastening members 87BT (FIG. 3).

As shown in FIG. 14 and FIG. 15, the side panel rear lower parts 151C are formed into the shape projecting outside of the vehicle width direction toward the rear side, and are formed into the panel shape arranged along the inner shapes of the right and left lateral surfaces of the rear fuel tank 38.

More specifically, as shown in FIG. 14 and FIG. 15, the side panel rear lower parts 151C are provided integrally with upper and lower panel parts 151C1, 151C2 projecting outside of the vehicle width direction at intervals in the vertical direction and also extending rearward, and right and left side panel parts 151C3 connecting ends of the upper and lower panel parts 151C1, 151C2 on the outer side in the vehicle width direction, and are formed to have a recessed cross-sectional surface opened toward the inner side in the vehicle width direction.

The side panel parts 151C3 are formed into a panel shape arranged along the right and left lateral surfaces (the lateral surface parts 92D and the outer surface parts 91D) of the rear fuel tank 38. The upper panel parts 151C1 are formed into a panel shape arranged along the right and left upper surfaces of the rear fuel tank 38. The lower panel parts 151C2 are formed into a panel shape arranged along the right and left bottom surfaces (the bottom surface parts 92B, 91B) of the rear fuel tank 38.

With this arrangement, the rear fuel tank 38 can be fitted between the right and left side panel rear lower parts 151C so as to be freely taken in and out from behind, and the movement of the rear fuel tank 38 in the horizontal direction and the vertical direction is regulated. Also, detachment work of the rear fuel tank 38 is facilitated by pulling out the rear fuel tank 38 from the right and left side panel rear lower parts 151C to the rear side.

Each boundary division between the side panel parts 151C3 of the side panel rear lower parts 151C and the lower panel parts 151C2 thereof is formed to have a bent surface MC projecting downward on the outer side in the vehicle width direction. Each bent surface MC is an inclined surface inclined downward on the inner side in the vehicle width direction as viewed from the front side of the vehicle body, and is formed as a surface arranged along each of the bent surfaces MA, MB formed in each boundary division between the lateral surfaces 92D, 91D of the rear fuel tank 38 and the bottom surface parts 92B, 91B thereof.

Holes communicating with the fastened parts NT6, NT7 provided with respect to the bent surfaces MA, MB of the rear fuel tank 38 are formed in the bent surfaces MC. A plurality (six in total, in this example,) of fastening members BT6, BT7 (fastening bolts in the present structure) shown in FIG. 2 are fastened to the fastened parts NT6, NT7 through the holes. For this reason, the side panel parts 151 and the rear fuel tank 38 are fastened and fixed to each other.

Note that a muffler stay 154 shown in FIG. 2 is attached to the left side panel part 151. The muffler 63 is supported by the left side panel part 151 through the muffler stay 154.

As shown in FIG. 12, the upper cross part 152 bridges between the right and left side panel rear upper parts 151B. The upper cross part 152 is provided integrally with a bridging plate part 152A bridging between the rear parts while ensuring an opening 151K in the front part between the right and left side panel rear upper parts 151B and a lower extending plate part 152B bent from a front edge of the bridging plate part 152A and extending downward. The bridging plate part 152A is placed on the upwardly swelling part 92CR of the rear fuel tank 38, and is fixed to the fastened parts NT4, NT5 through the holes communicating with the fastened parts NT4, NT5 (FIG. 4) provided to the upwardly swelling part 92CR by a pair of right and left fastening members BT4, BT5 (fastening bolts in the preset structure).

The lower extending plate part 152B abuts on the front surface 92CR1 of the upwardly swelling part 92CR, and is fixed to the fastened part NT3 through the hole communicating with the fasted part NT3 (FIG. 4) provided to the front surface 92CR1 by a pair of right and left fastening members BT3 (fastening bolts in the present structure). With this structure, the upper cross part 152 and the front tank part 92 are fastened and fixed to each other.

A battery tray 162 is detachably fixed through a clip 161 to the bridging plate part 152A of the upper cross part 152. The battery tray 162 extends forward of the vehicle body so as to cover the opening 151K formed between the right and left side panel rear upper parts 151B. The battery 131, an electric component (specifically, a fuse box) 133 related to the battery, and another electric component (specifically, an LAF sensor for detecting concentration of oxygen in exhaust gas) 135 are arranged on the upper surface of the battery tray 162. Also, the bridging plate part 152A of the upper cross part 152 is formed into a recessed shape with a center part in the vehicle width direction recessed downward, and electric components (specifically, wires) 137 are arranged in the recessed part.

In the side view of the vehicle body (see FIG. 2), the battery tray 162 extends forward along the front upper surface part 92CF of the rear fuel tank 38 to thereby extend forward toward the air cleaner 58, and supports the battery 131 or the like using an open space formed behind the air cleaner 58 and below the seat 17.

Figure 16:
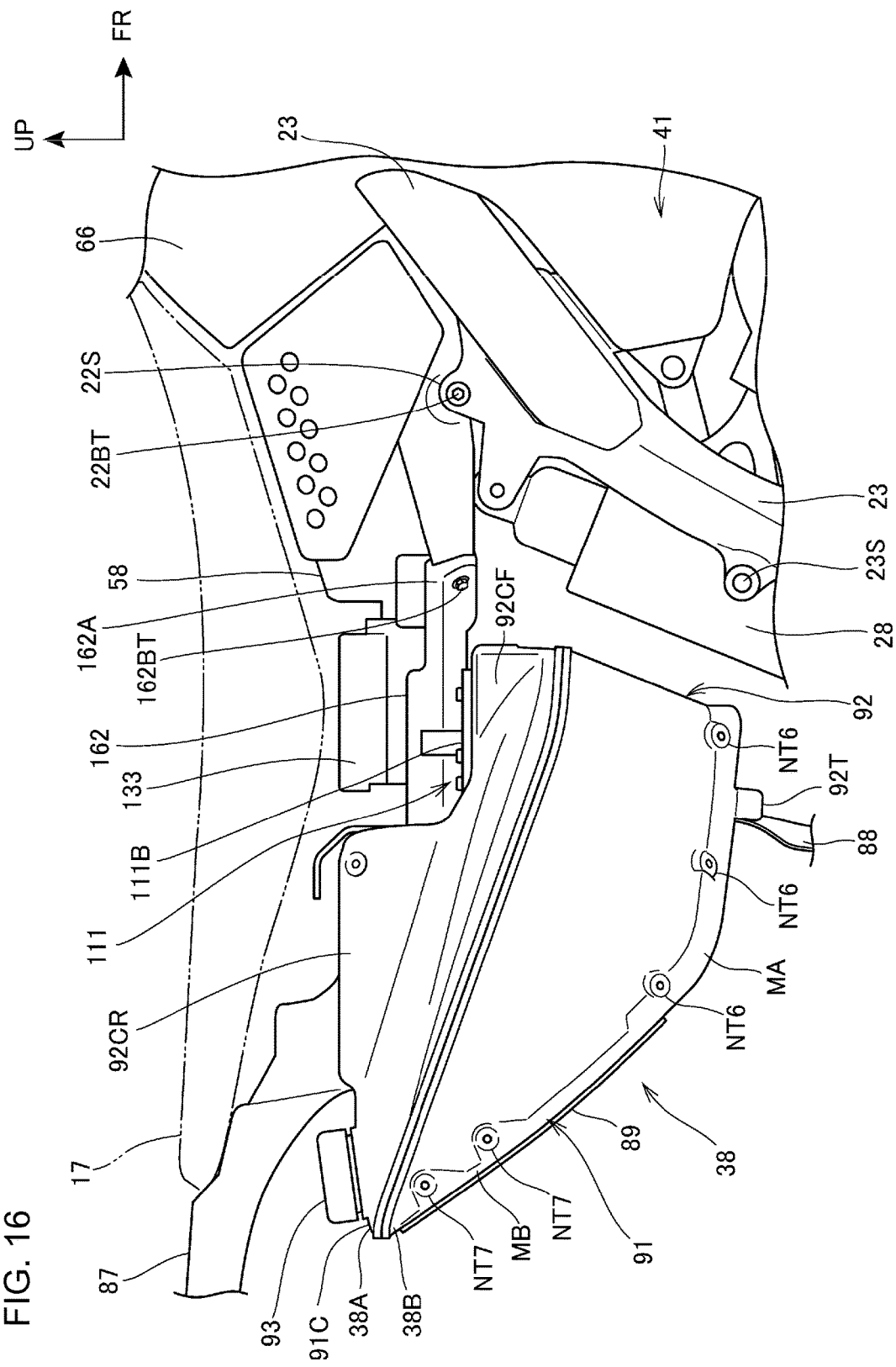
FIG. 16 is a view showing a battery tray together with a perimeter structure from a right side.

FIG. 16 is a view showing the battery tray 162 together with the perimeter structure from the right side. Note that FIG. 16 shows the view with the rear frame 24 removed. The battery tray 162 is placed on the front upper surface part 92CF of the rear fuel tank 38, and is supported on the rear frame 24 through the rear fuel tank 38. The battery tray 162 has a front part 162A overlapping with a rear lower part of the air cleaner 58 in the side view, and the front part is fixed to the rear lower part of the air cleaner 58 through a fastening member 162BT (a fastening bolt in the present structure).

As shown in FIG. 13, the front cross part 153 of the rear frame 24 is provided between the right and left side panel parts 151 in front of the rear fuel tank 38. The front cross part 153 is formed to have an L-shaped cross-sectional shape provided integrally with a panel-shaped front cross body part 153A abutting on the front surface part 92A of the front tank part 92 in the rear fuel tank 38, and a panel-shaped front cross lower part 153B extending rearward from a lower edge of the front cross body part 153A and abutting on the bottom surface part 92B of the front tank part 92.

Connection strength between the right and left side panel parts 151 of the rear frame 24 can be improved by providing the front cross part 153, and also the forward movement and the downward movement of the rear fuel tank 38 can be regulated.

The front cross body part 153A is formed with holes communicating with the fastened parts NT1 (FIG. 6) provided with respect to the front surface part 92A of the front tank part 92. A plurality (six in total) of fastening members BT1 (fastening bolts in the present structure) shown in FIG. 13 are fastened to the fastened parts NT1 through the holes. Thereby, the front cross body part 153A and the rear fuel tank 38 are fastened and fixed to each other. Also, the front cross lower part 153B is formed with holes communicating with the fastened parts NT2 (FIG. 8) provided with respect to the bottom surface part 92B of the front tank part 92. A plurality (three in total) of fastening members BT2 (fastening bolts in the present structure) shown in FIG. 15 are fastened to the fastened parts NT2 through the holes. Thereby, the front cross lower part 153B and the rear fuel tank 38 are fastened and fixed to each other.

In this way, the side panel parts 151, the upper cross part 152, and the front cross part 153 of the rear frame 24 are fastened and fixed to the rear fuel tank 38, and the rear frame 24 and the rear fuel tank 38 can be integrated with each other.

Note that a chain guard 155 is mounted to the front cross lower part 153B. The chain guide 155 is provided to extend forward of the recessed part 91W formed in the back surface of the rear fuel tank 38 and recessed upward.

The rear fuel tank 38 according to the embodiment is the resin tank molded to have the bent surfaces MA, MB (bent parts) with the boundaries between the side surface parts (the lateral surface parts 92D and the outer surface parts 91D) and the bottom surface parts 92B, 91B of the rear fuel tank 38 bent. The upper part of the rear fuel tank 38 is fastened and fixed to the upper cross part 152 of the monocoque rear frame 24, and the bent surfaces MA, MB of the rear fuel tank 38 are fastened and fixed to the side panel parts 151 of the rear frame 24.

With this structure, the rear fuel tank 38 is fastened and fixed to the rear frame 24 by using the bent surfaces MA, MB having relatively higher rigidity than that of the other part. Thereby, the connection strength between the rear fuel tank 38 and the rear frame 24 can be increased without requiring a special reinforcing member. Besides, since the bent surfaces MA, MB are provided at the boundaries between the side surface parts (the lateral surface parts 92D and the outer surface parts 91D) and the bottom surface parts (the bottom surface part 92B and the bottom surface parts 91B) of the rear fuel tank 38, a load of the rear fuel tank 38 in a vertical direction is easily supported by the side panel parts 151 of the rear frame 24.

Further, the upper part of the rear fuel tank 38 is fastened and fixed to the upper cross part 152 of the monocoque rear frame 24. For this reason, the rear fuel tank 38 can be supported by both the upper cross part 152 and the side panel parts 151 of the monocoque rear frame 24, and supporting strength can be sufficiently increased.

In this way, in comparison with the case that the rear frame 24 is tentatively formed into a shape for enclosing the rear fuel tank 38, support force for the rear fuel tank 38 can be efficiently ensured while suppressing an increase in weight of the monocoque rear frame 24.

The side panel parts 151 are bent along the bent surfaces MA, MB of the rear fuel tank 38, and fastened and fixed to the rear fuel tank 38 by the fastening members BT6, BT7 from below in the vehicle width direction. For this reason, the load of the rear fuel tank 38 in the vertical direction can be efficiently supported by the side panel parts 151.

Besides, as shown in FIG. 15, the fastening members BT6, BT7 are fastened from below an obliquely outer side. Therefore, in comparison with the case that the fastening members BT6, BT7 are fastened from immediately below or from an immediately lateral position, the side panel parts 151 and the rear fuel tank 38 can be firmly fixed to each other. In addition, since the fastening members BT6, BT7 become less visible from above, appearance quality can be also improved.

The rear frame 24 is provided with the front cross part 153 provided between the right and left side panel parts 151 in front of the rear fuel tank 38, and the front surface part 92A of the rear fuel tank 38 is fastened and fixed to the front cross part 153. For this reason, the forward movement of the rear fuel tank 38 can be regulated, and the rear fuel tank 38 can be more firmly supported.

The front cross part 153 is formed into the plate-like shape having the L-shaped cross-sectional surface for covering the front side and the lower side of the rear fuel tank 38, and is fastened and fixed to the bottom surface part 92B of the rear fuel tank 38 by means of the front cross lower part 153B for covering the lower side. For this reason, the downward movement of the rear fuel tank 38 can be regulated, and the rear fuel tank 38 can be more firmly supported.

As has been described above, the rear fuel tank 38 according to the embodiment is provided with the pump opening 96 for mounting therein the fuel pump 111 and formed in the position on the inner side of the front tank part 92 in the vehicle width direction in comparison with the lateral walls (the inner surface parts 91U) on the inner side in the vehicle width direction of the lateral tank parts 91. Thereby, in comparison with the case that the pump opening 96 is provided to the lateral tank parts 91, the plane for mounting the fuel pump 111 is easily ensured, and the fuel pump 111 can be mounted without increasing the width of the lateral tank parts 91. Besides, the fuel pump 111 can be arranged avoiding the joint part between the lateral tank parts 91 and the front tank part 92, the joint part being easily deformed when receiving the load. For this reason, the sealability between the rear fuel tank 38 and the fuel pump 111 can be ensured by the simple sealing structure.

Note that the inner surface parts 91U as the lateral walls on the inner side in the vehicle width direction are formed as the substantially flat surfaces. A part of the pump opening 96 has only to be located on the inner side in the vehicle width direction in comparison with forward extension lines LU of the inner surface parts 91U, as shown in FIG. 9. More preferably, more than half of the pump opening 96 has only to be located on the inner side in the vehicle width direction in comparison with the extension lines LU.

The fuel pump 111 is mounted to the fuel pump mounting parts 97 provided with respect to the upper surface 92C of the front tank part 92, and the upwardly swelling part 92CR upwardly swelling from the upper surface 92C of the front tank part 92 is formed behind the fuel pump mounting part 97. For this reason, the rigidity around the fuel pump mounting part 97 is increased, and the sealability between the rear fuel tank 38 and the fuel pump 111 is more easily ensured.

Since the inside of the upwardly swelling part 92CR is made to serve as the fuel space, the tank capacity can be increased by the part of the upwardly swelling part 92CR.

Since the upwardly swelling part 92CR is formed to have the width larger than the width of the rear wheel 16, the mud or the like scattered from the rear wheel 16 can be suppressed from scattering forward.

Since the battery 131 is provided above the front upper surface part 92CF of the front tank part 92 and in front of the upwardly swelling part 92CR, the battery 131 can be arranged using the dead space opened above the front tank part 92. Also, since the upwardly swelling part 92CR swells higher than the battery 131, the mud or the like scattered from the rear wheel 16 can be suppressed from intruding into the battery 131.

Since the front part of the battery tray 162 for supporting the battery 131 is supported by the air cleaner 58 arranged in front of the battery 131, the exclusive member for supporting the battery tray 162 can be reduced.

The fuel pump 111 is offset to one of the right side and the left side with respect to the centerline LC in the vehicle width direction of the rear wheel 16, and the battery 131 is arranged on the other side so as not to overlap with the fuel pump mounting part 97 when viewed from above. For this reason, the fuel pump 111 and the battery 131 can be distributedly arranged on the right side and the left side. In comparison with the case that the battery 131 is tentatively arranged above the fuel pump 111, the battery 131 can be arranged to be lowered. This structure contributes to the lowering of the center of gravity.

The position behind the rear fuel tank 38 and the battery 131 is swollen so as to form the fuel space. In other words, since the mounting position for the fuel pump 111 and the battery 131 can be lowered while ensuring the fuel capacity, the lowering of the center of gravity of the vehicle can be achieved.

The recessed part 91W recessed upward while avoiding the chain 65 for transmitting the driving force to the rear wheel 16 is formed in one of the right and left bottom surface parts 91B of the rear fuel tank 38, and the fuel pump 111 is arranged in the position on the other of the right side and the left side of the rear fuel tank 38 and not overlapping with the recessed part 91W when viewed from above. For this reason, the remaining amount of fuel not sucked by the fuel pump 111 (the remaining amount that is unexpendable) can be reduced.

As has been described above, in the embodiment, the rear frame 24 is provided with the right and left side panel parts 151, and the upper cross part 152 provided between the upper parts of the right and left side panel parts 151. The rear fuel tank 38 is the resin tank molded to have the bent surfaces MA, MB (the bent parts) with the boundaries between the lateral parts (the lateral surface parts 92D and the outer surface parts 91D) and the bottom surface parts 92B, 91B of the rear fuel tank 38 bent. The upper part of the rear fuel tank 38 is fastened and fixed to the upper cross part 152, and the bent surfaces MA, MB of the rear fuel tank 38 are fastened and fixed to the side panel parts 151. Thereby, the rear fuel tank 38 can be fastened and fixed to the rear frame 24 by using the bent surfaces MA, MB having relatively higher rigidity than the other part, and the connection strength between the rear fuel tank 38 and the rear frame 24 can be increased without requiring the special reinforcing member. For this reason, in comparison with the case that the rear frame 24 is formed into the shape for enclosing the rear fuel tank 38, the support force for the rear fuel tank 38 can be efficiently ensured while suppressing the increase in the weight of the monocoque rear frame 24.

The side panel parts 151 are bent along the bent surfaces MA, MB of the rear fuel tank 38, and are fastened and fixed to the rear fuel tank 38 by the fastening members BT6, BT7 from below in the vehicle width direction. For this reason, the load of the rear fuel tank 38 in the vertical direction can be efficiently supported by the side panel parts 151.

The rear frame 24 is provided with the front cross part 153 provided between the right and left side panel parts 151 in front of the rear fuel tank 38, and the front surface part 92A of the rear fuel tank 38 is fastened and fixed to the front cross part 153. For this reason, the forward movement of the rear fuel tank 38 can be regulated, and the rear fuel tank 38 can be more firmly supported.

The front cross part 153 is formed into the plate-like shape having the L-shaped cross-sectional surface for covering the front side and the lower side of the rear fuel tank 38, and is fastened and fixed to the bottom surface part 92B of the rear fuel tank 38 by means of the front cross lower part 153B as the portion for covering the lower side. For this reason, the downward movement of the rear fuel tank 38 can be regulated, and the rear fuel tank 38 can be more firmly supported.

Note that in certain embodiments, the case that the bent surfaces MA, MB of the rear fuel tank 38 are fastened and fixed to the side panel parts 151 has been described; however, the vicinity of the bent surfaces MA, MB of the rear fuel tank 38 may be fastened and fixed to the side panel parts 151.

Since the rigidity is higher than the other part even in the vicinity of the bent surfaces MA, MB, also by the above-described structure, such an effect can be provided that the support force for the rear fuel tank 38 can be efficiently ensured while suppressing the increase in the weight of the monocoque rear frame 24.

The above-described embodiments merely show examples of the present invention, and various design modifications and application may be optionally made within the scope not departing from the gist of the present invention.

For example, in the above-described embodiments, the case that the rear fuel tank 38 is formed into the U-shaped fuel tank when viewed from above has been described; however, the present invention is not limited to the above-described embodiment. The rear fuel tank may be formed into a J-shaped fuel tank when viewed from above with one of the right and left lateral tank parts 91 removed.

In the above-describe embodiments, the case that the present invention is applied to the motorcycle 10 shown in FIG. 1 has been described; however, the present invention is not limited to the above-described embodiment. The present invention may be applied to the publicly known saddle-ride type vehicles. Note that the saddle-ride type vehicles include all vehicles with the rider riding on the vehicle body in a striding manner, and include not only motorcycles (including motorized bicycles) but also three-wheeled vehicles and four-wheeled vehicles such as ATVs (All Terrain Vehicles).

REFERENCE SIGNS LIST

10 . . . Motorcycle (saddle-ride type vehicle)
11 . . . Vehicle body frame
13 . . . Front wheel
14 . . . Swing arm
16 . . . Rear wheel
22 . . . Main frame
24 . . . Rear frame
41 . . . Engine
58 . . . Air cleaner
65 . . . Chain
91 . . . Lateral tank part
91B . . . Bottom surface part of lateral tank part
91D . . . Outer surface part (side wall)
91U . . . Inner surface part
92 . . . Front tank part
92A . . . Front surface part
92B . . . Bottom surface part of front tank part
92C . . . Upper surface
92CF . . . Front upper surface part (upper surface)
92CR . . . Upwardly swelling part
92D . . . Lateral surface part (side wall)
96 . . . Pump opening
97 . . . Fuel pump mounting part
111 . . . Fuel pump
131 . . . Battery
151 . . . Side panel part
152 . . . Upper cross part
153 . . . Front cross part
153B . . . Front cross lower part
162 . . . Battery tray
BT1-BT7 . . . Fastening part
LC . . . Centerline in vehicle width direction
MA, MB . . . Bent surface (bent part)

The invention claimed is:

1. A saddle-ride type vehicle, comprising:
an engine;
a vehicle body frame that supports the engine;
a swing arm that extends rearward from the vehicle body frame and that has a rear end with a rear wheel vertically swingably disposed thereat;
a rear fuel tank that is supported by a rear part of the vehicle body frame, the rear fuel tank comprising a lateral tank part that is disposed on a lateral side of the rear wheel, and a front tank part that is disposed in front of the rear wheel and that is connected to a front side of the lateral tank part; and
a fuel pump configured to feed fuel in the rear fuel tank to the engine,
wherein an opening is provided in the rear fuel tank for mounting therein the fuel pump, the opening being formed in a position on an inner side of the front tank part in a vehicle width direction in comparison with a lateral wall of the lateral tank part on the inner side in the vehicle width direction,
wherein a fuel pump is offset to either a right side or a left side from a centerline of the rear wheel in the vehicle width direction, and wherein a battery is disposed on the other side in order to prevent overlapping with a fuel pump mounting part when viewed from above.

2. The vehicle according to claim 1, wherein the fuel pump is mounted to a fuel pump mounting part formed on an upper surface of the front tank part, and an upwardly swelling part that swells upward from the upper surface of the front tank part is formed behind the fuel pump mounting part.

3. The vehicle according to claim 2, wherein an inside of the upwardly swelling part is configured as a fuel space.

4. The vehicle according to claim 2, wherein the upwardly swelling part has a width larger than a width of the rear wheel.

5. The vehicle according to claim 2, further comprising a battery disposed above the upper surface of the front tank part and in front of the upwardly swelling part.

6. The vehicle according to claim 5, wherein the upwardly swelling part swells upward beyond the battery.

7. The vehicle according to claim 5, further comprising a battery tray configured to support the battery, wherein a front part of the battery tray is supported by an air cleaner disposed in front of the battery.

8. The vehicle according to claim 1, wherein a recessed part that is recessed upward while avoiding a chain for transmitting driving force to the rear wheel is formed in a bottom part on either a right side or a left side of the rear fuel tank, and the fuel pump is disposed in a position located on the other side of the right side and the left side of the rear fuel tank and prevent overlapping with the recessed part when viewed from above.

9. A saddle-ride type vehicle, said vehicle comprising:
engine means for providing motive power;
body frame means for supporting the engine means;
swing arm means extending rearward from the body frame means and having a rear end with a rear wheel vertically swingably disposed thereat;
fuel tank means for storing fuel therein, said fuel tank means being supported by a rear part of the body frame means; and
fuel pump means for feeding fuel from the fuel tank means to the engine means,
wherein an opening is provided in the fuel tank means for supporting the fuel pump means therein, the opening being formed in a position on an inner side of a front tank part of the fuel tank means in a vehicle width direction in comparison with a lateral wall of a lateral tank part on the inner side in the vehicle width direction,
wherein a fuel pump is offset to either a right side or a left side from a centerline of the rear wheel in the vehicle width direction, and wherein a battery is disposed on the other side in order to prevent overlapping with a fuel pump mounting part when viewed from above.

10. The vehicle according to claim 9, wherein the fuel pump means is mounted to mounting means formed on an upper surface of the front tank part of the fuel tank means, and wherein an upwardly swelling part that swells upward from the upper surface of the front tank part is formed behind the mounting means.

11. The vehicle according to claim 10, wherein an inside of the upwardly swelling part forms a fuel space.

12. The vehicle according to claim 10, wherein the upwardly swelling part has a width which is larger than a width of the rear wheel.

13. The vehicle according to claim 10, further comprising battery means for providing electrical energy, said battery means being disposed above the upper surface of the front tank part and in front of the upwardly swelling part.

14. The vehicle according to claim 13, wherein the upwardly swelling part swells upward beyond the battery means.

15. The vehicle according to claim 13, further comprising battery tray means for supporting the battery means therein, wherein a front part of the battery tray means is supported by an air cleaner disposed in front of the battery means.

16. The vehicle according to claim 9, wherein a recessed part that is recessed upward while avoiding a chain means for transmitting driving force to the rear wheel is formed in a bottom part on either a right side or a left side of the fuel tank means, and wherein the fuel pump means is disposed in a position located on the other side of the right side and the left side of the fuel tank means and to prevent overlapping with the recessed part when viewed from above.

* * * * *